(12) United States Patent
Kim et al.

(10) Patent No.: US 10,768,809 B2
(45) Date of Patent: Sep. 8, 2020

(54) MOBILE TERMINAL AND METHOD FOR MANAGING A PLURALITY OF NOTIFICATION INFORMATION ACCORDING TO USER INPUT

(71) Applicant: LG ELECTRONICS INC., Seoul (KR)

(72) Inventors: Eunhye Kim, Seoul (KR); Taeyoung Jeon, Seoul (KR)

(73) Assignee: LG ELECTRONICS INC., Seoul (KR)

(*) Notice: Subject to any disclaimer, the term of this patent is extended or adjusted under 35 U.S.C. 154(b) by 294 days.

(21) Appl. No.: 15/463,279

(22) Filed: Mar. 20, 2017

(65) Prior Publication Data

US 2018/0046367 A1  Feb. 15, 2018

(30) Foreign Application Priority Data

Aug. 12, 2016  (KR) .......................... 10-2016-0103173

(51) Int. Cl.
*G06F 3/0488* (2013.01)
*G06F 3/0482* (2013.01)
(Continued)

(52) U.S. Cl.
CPC ........ *G06F 3/04886* (2013.01); *G06F 3/0482* (2013.01); *G06F 3/0485* (2013.01);
(Continued)

(58) Field of Classification Search
CPC combination set(s) only.
See application file for complete search history.

(56) References Cited

U.S. PATENT DOCUMENTS 8,645,825 B1 * 2/2014 Cornea ................. G06F 17/276
715/257
2008/0055269 A1   3/2008 Lemay et al.
(Continued)

FOREIGN PATENT DOCUMENTS

EP         2770417 A2    8/2014
EP         2950192 A1   12/2015
(Continued)

*Primary Examiner* — Sherief Badawi
*Assistant Examiner* — Wendy Nicholas
(74) *Attorney, Agent, or Firm* — Birch, Stewart, Kolasch & Birch, LLP

(57) ABSTRACT

A mobile terminal including a wireless communication unit configured to provide wireless communication; a display configured to display at least a first notification information at a first position on the display indicating a first event occurred on the mobile terminal, and display a second notification information at a second position on the display indicating a second event occurred on the mobile terminal; and a controller configured to in response to a selection of the first notification information, display a first input region and a first key region for inputting a character string into the first input region on the display adjacent to the first notification information, in response to a selection of the second notification information, display a second input region and a second key region for inputting the character string into the second input region on the display adjacent to the second notification information, and process the character string input into the first input region or the second input region as an input of a function for responding to the first notification information or the second notification information, respectively, according to a selection of a user.

19 Claims, 21 Drawing Sheets

(51) Int. Cl.
  *G06F 3/0486* (2013.01)
  *H04L 12/58* (2006.01)
  *G06F 40/274* (2020.01)
  *G06F 3/0485* (2013.01)

(52) U.S. Cl.
  CPC .......... *G06F 3/0486* (2013.01); *G06F 40/274* (2020.01); *H04L 51/04* (2013.01)

(56) References Cited

U.S. PATENT DOCUMENTS

| | | | | |
|---|---|---|---|---|
| 2009/0111486 | A1* | 4/2009 | Burstrom | H04M 1/72547 455/456.3 |
| 2009/0231281 | A1* | 9/2009 | Whytock | G06F 3/04886 345/168 |
| 2011/0072363 | A1* | 3/2011 | Mandel | G06Q 10/107 715/752 |
| 2012/0317499 | A1* | 12/2012 | Shen | H04L 51/04 715/752 |
| 2013/0179800 | A1* | 7/2013 | Jeong | G06F 3/04817 715/752 |
| 2013/0346922 | A1* | 12/2013 | Shiplacoff | G06F 3/04842 715/835 |
| 2014/0245256 | A1* | 8/2014 | Petzoldt | G05B 19/056 717/109 |
| 2014/0302829 | A1* | 10/2014 | Won | H04M 3/436 455/415 |
| 2014/0304616 | A1 | 10/2014 | Park et al. | |
| 2015/0012862 | A1* | 1/2015 | Ikeda | G06F 3/0485 715/770 |
| 2015/0077346 | A1* | 3/2015 | Tu | G06F 3/0238 345/173 |
| 2015/0094120 | A1* | 4/2015 | Suh | G06F 3/04883 455/566 |
| 2015/0242086 | A1* | 8/2015 | Mindlin | G06F 3/0481 715/769 |
| 2016/0065509 | A1* | 3/2016 | Yang | H04L 51/22 715/752 |

FOREIGN PATENT DOCUMENTS

| | | |
|---|---|---|
| WO | WO 2009/053115 A1 | 4/2009 |
| WO | 2015/183499 A1 | 12/2015 |

\* cited by examiner

MOBILE TERMINAL AND METHOD FOR MANAGING A PLURALITY OF NOTIFICATION INFORMATION ACCORDING TO USER INPUT

CROSS-REFERENCE TO RELATED APPLICATION

Pursuant to 35 U.S.C. § 119(a), this application claims the benefit of earlier filing date and right of priority to Korean Application No. 10-2016-0103173, filed on Aug. 12, 2016, the contents of which is incorporated by reference herein in its entirety.

BACKGROUND OF THE INVENTION

1. Field of the Invention

The present disclosure relates to a mobile terminal and a control method of the same.

2. Description of the Related Art

Terminals may be divided into mobile/portable terminals and stationary terminals. The mobile terminals may be further classified into handheld terminals and vehicle mount terminals.

The functionality of the mobile terminal has been diversified according to the development of technologies. For example, such a mobile terminal may be allowed to capture still images or moving images, play music or video files, play games, receive broadcast and the like, so as to be implemented as an integrated multimedia player. Moreover, in order to support and enhance the functions of the terminal, the improvement of structural or software elements of the terminal may be taken into consideration.

As part of the improvement, notification information is displayed for notifying a user of various events that occurred on their mobile terminal. A function of displaying an event through the notification information has been enhanced to allow the user to immediately perform a specific application or function through the displayed notification information as well as simply display only the information of a currently occurring event, thereby providing higher convenience to the user.

However, such a notification information providing function only provides a function of allowing the user to easily and quickly execute a function associated with any one event. Accordingly, each notification information has to be individually processed when a plurality of notification information are displayed or confusion may cause difficulties as a similar function is performed when there is similar notification information.

SUMMARY OF THE INVENTION

An object of the present disclosure is to solve the foregoing and other problems, and provide a mobile terminal and a control method thereof capable of allowing a user to process a plurality of notification information in an easier and more convenient manner.

Furthermore, an object of the present disclosure is to provide a mobile terminal and a control method thereof capable of allowing a user to enter a character, a symbol or a multimedia content in an easier and more convenient manner as an input for mobile terminal functions corresponding to the plurality of notification information, respectively.

In addition, an object of the present disclosure is to provide a mobile terminal and a control method thereof capable of distinguishing notification information to which a user input is applied when the user input is applied to any one of the plurality of notification information.

In order to accomplish the foregoing and other objects, according to an aspect of the present disclosure, a mobile terminal according to an embodiment of the present disclosure may include a display unit configured to display a plurality of notification information according to a preset order, and a controller configured to display a first input region displayed with a character string entered into first notification information and a first key region for receiving the character string in a region adjacent to the first notification information when the first notification information is selected from the plurality of notification information, and process the character string entered into the first input region according to a user's selection as an input of a function corresponding to the first notification information.

In order to accomplish the foregoing and other objects, according to another aspect of the present disclosure, a control method of a mobile terminal according to an embodiment of the present disclosure may include displaying a plurality of notification information according to a preset order, displaying a first input region displayed with a character string entered into first notification information when the first notification information is selected from the plurality of notification information, displaying a first key region for the character string subsequent to the first input region, displaying a character string according to a user input applied through the first key region in the first input region, and processing a character string entered into the first input region as an input of a function corresponding to the first notification information according to a user's selection, wherein the first notification information, the first input region displayed subsequent to the first notification information, and a first key region displayed subsequent to the first input region are displayed in a preset region or between second notification information displayed subsequent to the first notification information according to a preset order and the first notification information.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like. However, it may be easily understood by those skilled in the art that the configuration according to the exemplary embodiments of this specification can also be applied to stationary terminals such as a digital TV, a desktop computer, a digital signage and the like, excluding a case of being applicable only to the mobile terminals.

Figure 1A:
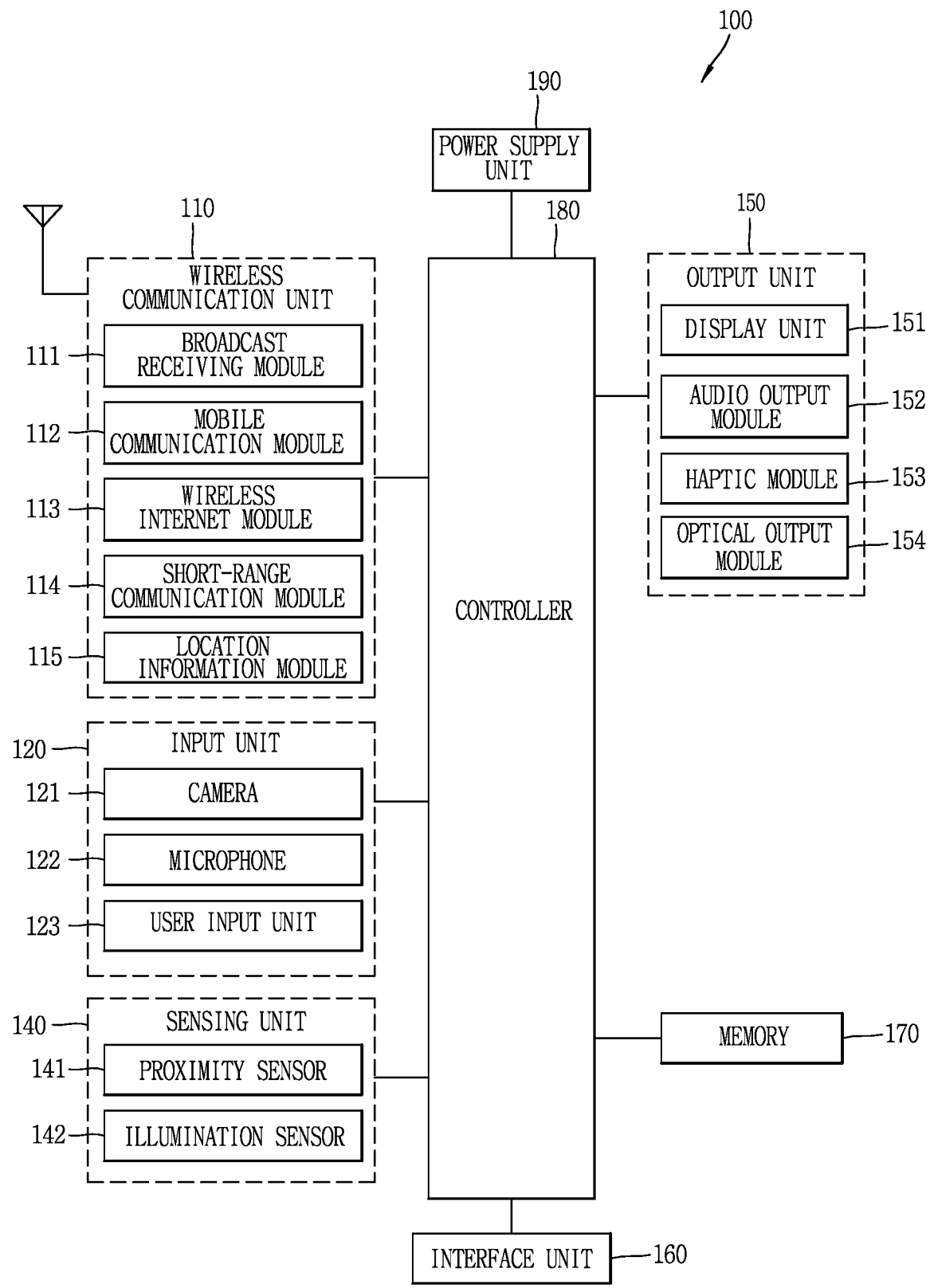
FIG. 1A is a block diagram illustrating a mobile terminal according to an embodiment of the present disclosure.

First of all, FIG. 1A is a block diagram illustrating explaining a mobile terminal 100 according to an embodiment of the present disclosure. The mobile terminal 100 may include components, such as a wireless communication unit 110, an input unit 120, a sensing unit 140, an output unit 150, an interface unit 160, a memory 170, a controller 180, a power supply unit 190 and the like. FIG. 1 illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located. For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key (or a mechanical key), etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). Further, the mobile terminal disclosed herein may utilize information in such a manner of combining information sensed by at least two sensors of those sensors.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

Furthermore, the memory 170 may store data for supporting various functions of the mobile terminal 100. The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). Further, the application programs may be stored in the memory 170, installed in the mobile terminal 100, and executed by the controller 180 to perform an operation (or a function) of the mobile terminal 100.

The controller 180 can typically control an overall operation of the mobile terminal 100 in addition to the operations associated with the application programs. The controller 180 can provide or process information or functions appropriate for a user by processing signals, data, information and the like, which are input or output by the aforementioned components, or activating the application programs stored in the memory 170.

The controller 180 can control at least part of the components illustrated in FIG. 1A, in order to drive the application programs stored in the memory 170. In addition, the controller 180 can drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be an embedded battery or a replaceable battery.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Hereinafter, each aforementioned component will be described in more detail with reference to FIG. 1A, prior to explaining various exemplary embodiments implemented by the mobile terminal 100 having the configuration. First, the wireless communication unit 110 will be described. The broadcast receiving module 111 of the wireless communication unit 110 may receive a broadcast signal and/or broadcast associated information from an external broadcast managing entity via a broadcast channel. The broadcast channel may include a satellite channel and a terrestrial channel. At least two broadcast receiving modules 111 may be provided in the mobile terminal 100 to simultaneously receive at least two broadcast channels or switch the broadcast channels.

The mobile communication module 112 may transmit/receive wireless signals to/from at least one of network entities, for example, a base station, an external mobile terminal, a server, and the like, on a mobile communication network, which is constructed according to technical standards or transmission methods for mobile communications (for example, Global System for Mobile Communication (GSM), Code Division Multi Access (CDMA), Wideband CDMA (WCDMA), High Speed Downlink Packet access (HSDPA), Long Term Evolution (LTE), Long Term Evolution-Advanced (LTE-A), etc.). The wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. The wireless Internet module 113 may transmit/receive wireless signals via communication networks according to wireless Internet technologies.

Examples of such wireless Internet access may include Wireless LAN (WLAN), Wireless Fidelity (Wi-Fi) Direct, Digital Living Network Alliance (DLNA), Wireless Broadband (Wibro), Worldwide Interoperability for Microwave Access (Wimax), High Speed Downlink Packet Access (HSDPA), High Speed Uplink Packet Access (HSUPA), Long Term Evolution (LTE), Long Term Evolution-Advanced (LTE-A) and the like. The wireless Internet module 113 may transmit/receive data according to at least one wireless Internet technology within a range including even Internet technologies which are not aforementioned.

From the perspective that the wireless Internet accesses according to Wibro, HSDPA, GSM, CDMA, WCDMA, LTE, LTE-A and the like are executed via a mobile communication network, the wireless Internet module 113 which performs the wireless Internet access via the mobile communication network may be understood as a type of the mobile communication module 112.

The short-range communication module 114 denotes a module for short-range communications. Suitable technologies for implementing the short-range communications may include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless Universal Serial Bus (Wireless USB) and the like. The short-range communication module 114 may support wireless communications between the mobile terminal 100 and a wireless communication system, between the mobile terminal 100 and another mobile terminal 100, or between the mobile terminal and a network where another mobile terminal 100 (or an external server) is located, via wireless personal area networks.

Here, the another mobile terminal 100 may be a wearable device, for example, a smart watch, a smart glass or a head mounted display (HMD), which can exchange data with the mobile terminal 100 (or to cooperate with the mobile terminal 100). The short-range communication module 114 may sense (recognize) a wearable device, which can communicate with the mobile terminal, near the mobile terminal 100. In addition, when the sensed wearable device is a device which is authenticated to communicate with the mobile terminal 100 according to the present disclosure, the controller 180 can transmit at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user can answer the call using the wearable device. Also, when a message is received in the mobile terminal 100, the user can check the received message using the wearable device.

The location information module 115 denotes a module for detecting or calculating a position of the mobile terminal. An example of the location information module 115 may include a Global Position System (GPS) module or a Wireless Fidelity (Wi-Fi) module. For example, when the mobile terminal uses the GPS module, a position of the mobile terminal may be acquired using a signal sent from a GPS satellite. As another example, when the mobile terminal uses the Wi-Fi module, a position of the mobile terminal may be acquired based on information related to a wireless access point (AP) which transmits or receives a wireless signal to or from the Wi-Fi module. As needed, the location information module 115 may perform any function of another module of the wireless communication unit 110 to obtain data for the location of the mobile terminal in a substituted or additional manner. The location information module 115, as a module used to acquire the location (or current location) of the mobile terminal, may not be necessarily limited to a module for directly calculating or acquiring the location of the mobile terminal.

Next, the input unit 120 may be configured to provide an audio or video signal (or information) input to the mobile terminal or information input by a user to the mobile terminal. For the input of the audio information, the mobile terminal 100 may include one or a plurality of cameras 121. The camera 121 may process image frames of still pictures or video obtained by image sensors in a video call mode or a capture mode. The processed image frames can be displayed on the display unit 151. Further, the plurality of cameras 121 disposed in the mobile terminal 100 may be arranged in a matrix configuration. By use of the cameras 121 having the matrix configuration, a plurality of image information having various angles or focal points may be input into the mobile terminal 100. Also, the plurality of cameras 121 may be arranged in a stereoscopic structure to acquire a left image and a right image for implementing a stereoscopic image.

The microphone 122 may process an external audio signal into electric audio data. The processed audio data may be utilized in various manners according to a function being executed in the mobile terminal 100 (or an application program being executed). Further, the microphone 122 may include assorted noise removing algorithms to remove noise generated in the course of receiving the external audio signal.

The user input unit 123 may receive information input by a user. When information is input through the user input unit 123, the controller 180 can control an operation of the mobile terminal 100 to correspond to the input information. The user input unit 123 may include a mechanical input element (or a mechanical key, for example, a button located on a front/rear surface or a side surface of the mobile terminal 100, a dome switch, a jog wheel, a jog switch, etc.), and a touch-sensitive input means. As one example, the touch-sensitive input means may be a virtual key, a soft key or a visual key, which is displayed on a touch screen through software processing, or a touch key which is disposed on a portion except for the touch screen. Further, the virtual key or the visual key may be displayable on the touch screen in various shapes, for example, graphic, text, icon, video or a combination thereof.

The sensing unit 140 may sense at least one of internal information of the mobile terminal, surrounding environment information of the mobile terminal and user information, and generate a sensing signal corresponding to it. The controller 180 can control an operation of the mobile terminal 100 or execute data processing, a function or an operation associated with an application program installed in the mobile terminal based on the sensing signal. Hereinafter, description will be given in more detail of representative sensors of various sensors which may be included in the sensing unit 140.

First, a proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may be arranged at an inner region of the mobile terminal covered by the touch screen, or near the touch screen. The proximity sensor 141 may have a longer lifespan and a more enhanced utility than a contact sensor.

The proximity sensor 141, for example, may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, the proximity sensor 141 may sense proximity of a pointer to the touch screen by changes of an electromagnetic field, which is responsive to an approach of an object with conductivity. In this instance, the touch screen (touch sensor) may be categorized into a proximity sensor.

Hereinafter, for the sake of brief explanation, a status that the pointer is positioned to be proximate onto the touch screen without contact will be referred to as 'proximity touch,' whereas a status that the pointer substantially comes in contact with the touch screen will be referred to as 'contact touch.' For the position corresponding to the proximity touch of the pointer on the touch screen, such position will correspond to a position where the pointer faces perpendicular to the touch screen upon the proximity touch of the pointer. The proximity sensor 141 may sense proximity touch, and proximity touch patterns (e.g., distance, direction, speed, time, position, moving status, etc.). Further, the controller 180 can process data (or information) corresponding to the proximity touches and the proximity touch patterns sensed by the proximity sensor 141, and output visual information corresponding to the process data on the touch screen. In addition, the controller 180 can control the mobile terminal 100 to execute different operations or process different data (or information) according to whether a touch with respect to the same point on the touch screen is either a proximity touch or a contact touch.

A touch sensor may sense a touch (or touch input) applied onto the touch screen (or the display unit 151) using at least one of various types of touch methods, such as a resistive type, a capacitive type, an infrared type, a magnetic field type, and the like. As one example, the touch sensor may be configured to convert changes of pressure applied to a specific part of the display unit 151 or a capacitance occurring from a specific part of the display unit 151, into electric input signals. Also, the touch sensor may be configured to sense not only a touched position and a touched area, but also touch pressure. Here, a touch object is an object to apply a touch input onto the touch sensor. Examples of the touch object may include a finger, a touch pen, a stylus pen, a pointer or the like.

When touch inputs are sensed by the touch sensors, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180 or the controller 180 itself.

Further, the controller 180 can execute a different control or the same control according to a type of an object which touches the touch screen (or a touch key provided in addition to the touch screen). Whether to execute the different control or the same control according to the object which gives a touch input may be decided based on a current operating state of the mobile terminal 100 or a currently executed application program.

Meanwhile, the touch sensor and the proximity sensor may be executed individually or in combination, to sense various types of touches, such as a short (or tap) touch, a long touch, a multi-touch, a drag touch, a flick touch, a pinch-in touch, a pinch-out touch, a swipe touch, a hovering touch, and the like.

An ultrasonic sensor may be configured to recognize position information relating to a sensing object by using ultrasonic waves. The controller 180 can calculate a position of a wave generation source based on information sensed by an illumination sensor and a plurality of ultrasonic sensors. Since light is much faster than ultrasonic waves, a time for which the light reaches the optical sensor may be much shorter than a time for which the ultrasonic wave reaches the ultrasonic sensor. The position of the wave generation source may be calculated using the fact. In more detail, the position of the wave generation source may be calculated by using a time difference from the time that the ultrasonic wave reaches based on the light as a reference signal.

The camera 121 constructing the input unit 120 may be a type of camera sensor (for example, CCD, CMOS, etc.) The camera sensor may include at least one of a photo sensor and a laser sensor. The camera 121 and the laser sensor may be combined to detect a touch of the sensing object with respect to a 3D stereoscopic image. The photo sensor may be laminated on the display device. The photo sensor may be configured to scan a movement of the sensing object in proximity to the touch screen. In more detail, the photo sensor may include photo diodes and transistors at rows and columns to scan content placed on the photo sensor by using an electrical signal which changes according to the quantity of applied light. Namely, the photo sensor may calculate the coordinates of the sensing object according to variation of light to thus obtain position information of the sensing object.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may also be implemented as a stereoscopic display unit for displaying stereoscopic images. The stereoscopic display unit may employ a stereoscopic display scheme such as stereoscopic scheme (a glass scheme), an auto-stereoscopic scheme (glassless scheme), a projection scheme (holographic scheme), or the like.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may also provide audible output signals related to a particular function (e.g., a call signal reception sound, a message reception sound, etc.) performed by the mobile terminal 100. The audio output module 152 may include a receiver, a speaker, a buzzer or the like.

A haptic module 153 can generate various tactile effects the user can feel. A typical example of the tactile effect generated by the haptic module 153 may be vibration. Strength, pattern and the like of the vibration generated by the haptic module 153 may be controllable by a user selection or setting of the controller. For example, the haptic module 153 may output different vibrations in a combining manner or a sequential manner.

Besides vibration, the haptic module 153 can generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 153 may be implemented to allow the user to feel a tactile effect through a muscle sensation such as the user's fingers or arm, as well as transferring the tactile effect through a direct contact. Two or more haptic modules 153 may be provided according to the configuration of the mobile terminal 100.

An optical output module 154 may output a signal for indicating an event generation using light of a light source. Examples of events generated in the mobile terminal 100 may include a message reception, a call signal reception, a missed call, an alarm, a schedule notice, an email reception, an information reception through an application, and the like. A signal output by the optical output module 154 may be implemented so the mobile terminal emits monochromatic light or light with a plurality of colors. The signal output may be terminated as the mobile terminal senses a user's event checking.

The interface unit 160 may serve as an interface with every external device connected with the mobile terminal 100. For example, the interface unit 160 may receive data transmitted from an external device, receive power to transfer to each element within the mobile terminal 100, or transmit internal data of the mobile terminal 100 to an external device. For example, the interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via the interface unit 160.

When the mobile terminal 100 is connected with an external cradle, the interface unit 160 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 may store programs for operations of the controller 180 and temporarily store input/output data (for example, phonebook, messages, still images, videos, etc.). The memory 170 may store data related to various patterns of vibrations and audio which are output in response to touch inputs on the touch screen.

The memory 170 may include at least one type of storage medium including a Flash memory, a hard disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 170 over the Internet.

As aforementioned, the controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform controlling and processing associated with voice calls, data communications, video calls, and the like, or perform pattern recognition processing to recognize a handwriting input or a picture drawing input performed on the touch screen as characters or images, respectively. In addition, the controller 180 can control one or combination of those components in order to implement various exemplary embodiment disclosed herein on the mobile terminal 100.

The power supply unit 190 may receive external power or internal power and supply appropriate power required for operating respective elements and components included in the mobile terminal 100 under the control of the controller 180. The power supply unit 190 may include a battery. The battery may be an embedded battery which is rechargeable or be detachably coupled to the terminal body for charging.

The power supply unit 190 may include a connection port. The connection port may be configured as one example of the interface unit 160 to which an external (re)charger for supplying power to recharge the battery is electrically connected. As another example, the power supply unit 190 may be configured to recharge the battery in a wireless manner without use of the connection port. Here, the power supply unit 190 may receive power, transferred from an external wireless power transmitter, using at least one of an inductive coupling method which is based on magnetic induction or a magnetic resonance coupling method which is based on electromagnetic resonance. Further, various embodiments described herein may be implemented in a computer-readable or its similar medium using, for example, software, hardware, or any combination thereof.

Hereinafter, the structure of the mobile terminal 100 according to an embodiment of the present disclosure illustrated in the above FIG. 1A or a mobile terminal disposed with the foregoing constituent elements will be described with reference to FIGS. 1B and 1C.

Figure 1B:
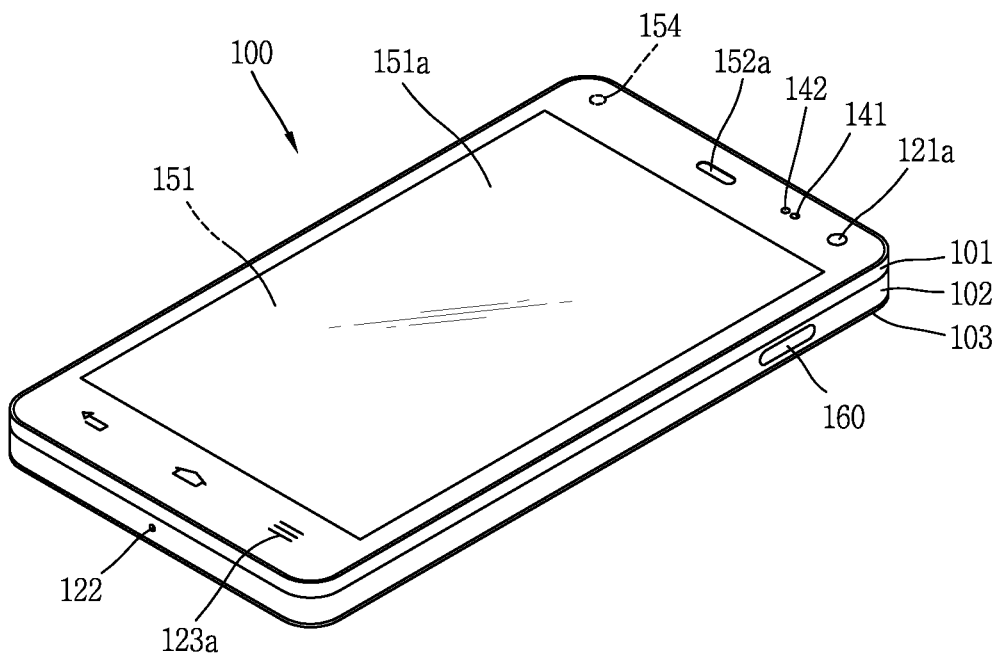
FIGS. 1B and 1C are conceptual views in which an example of a mobile terminal according to an embodiment of the present disclosure is seen from different directions.
Figure 1C:
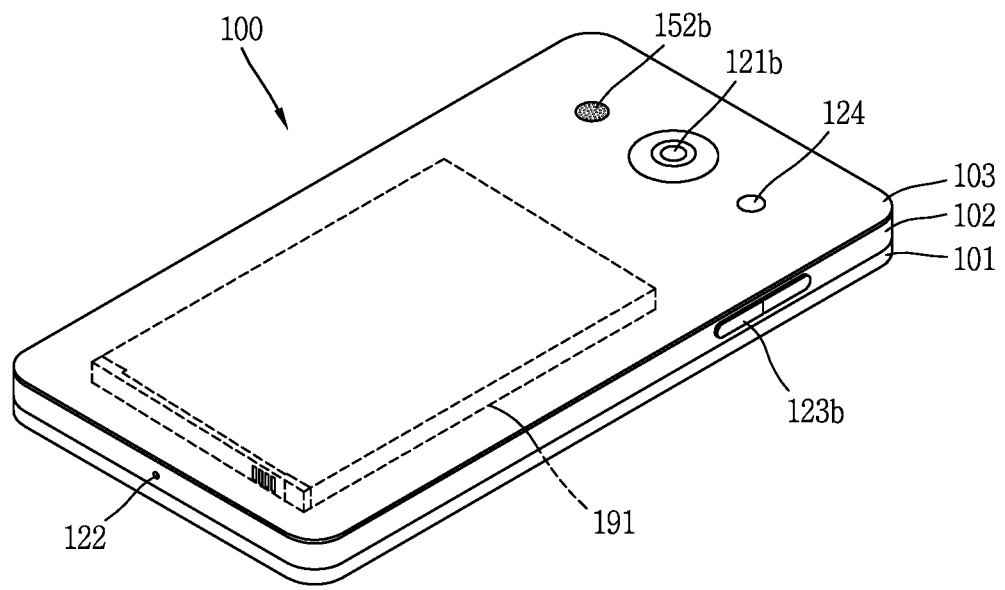

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. The description to be associated with a specific type of mobile terminal or on a specific type of mobile terminal will be also typically applied to another type of mobile terminal.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102

A display unit 151 may be disposed on a front surface of the terminal body to output information. As illustrated, a window 151*a* of the display unit 151 may be mounted to the front case 101 so as to form the front surface of the terminal body together with the front case 101. In some cases, electronic components may also be mounted to the rear case 102. Examples of those electronic components mounted to the rear case 102 may include a detachable battery, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. Further, the rear cover 103 may include an opening for externally exposing a camera 121*b* or an audio output module 152*b*.

The cases 101, 102, 103 may be formed by injection-molding synthetic resin or may be formed of a metal, for example, stainless steel (STS), titanium (Ti), or the like. Unlike the example which the plurality of cases form an inner space for accommodating such various components, the mobile terminal 100 may be configured such that one case forms the inner space. In this example, a mobile terminal 100 having a uni-body formed so synthetic resin or metal extends from a side surface to a rear surface may also be implemented.

Further, the mobile terminal 100 may include a waterproofing unit for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output modules 152a and 152b, a proximity sensor 141, an illumination sensor 152, an optical output module 154, first and second cameras 121a and 121b, first and second manipulation units 123a and 123b, a microphone 122, an interface unit 160 and the like.

Hereinafter, description will be given of a mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

However, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100 or user interface (UI) and graphic user interface (GUI) information in response to the execution screen information.

The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display. The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 can generate a control command corresponding to the touch. The content which is input in the touching manner may be a text or numerical value, or a menu item which can be indicated or designated in various modes.

The touch sensor may be configured in a form of film having a touch pattern. The touch sensor may be a metal wire, which is disposed between the window 151a and a display on a rear surface of the window 151a or patterned directly on the rear surface of the window 151a. Or, the touch sensor may be integrally formed with the display. For example, the touch sensor may be disposed on a substrate of the display or within the display. The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds. The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this instance, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process video frames such as still or moving images obtained by the image sensor in a video call mode or a capture mode. The processed video frames can be displayed on the display unit 151 or stored in the memory 170. The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure is not limited to this. For example, the first manipulation unit 123a may be configured with a mechanical key, or a combination of a touch key and a push key.

The content received by the first and second manipulation units 123a and 123b can be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

As another example of the user input unit 123, a rear input unit may be disposed on the rear surface of the terminal body. The rear input unit may be manipulated by a user to input a command for controlling an operation of the mobile terminal 100. The content input can be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123. The microphone 122 may be formed to receive the user's voice, other sounds, and the like. The microphone 122 may be provided at a plurality of places, and configured to receive stereo sounds.

The interface unit 160 may serve as a path allowing the mobile terminal 100 to exchange data with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a. The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a batter 191 which is mounted in the terminal body or detachably coupled to an outside of the terminal body. The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

Hereinafter, embodiments associated with a control method that can be implemented in the mobile terminal 100 having the foregoing configuration will be described with reference to the accompanying drawings. It should be understood by those skilled in the art that the present invention can be embodied in other specific forms without departing from the concept and essential characteristics thereof.

Figure 2:
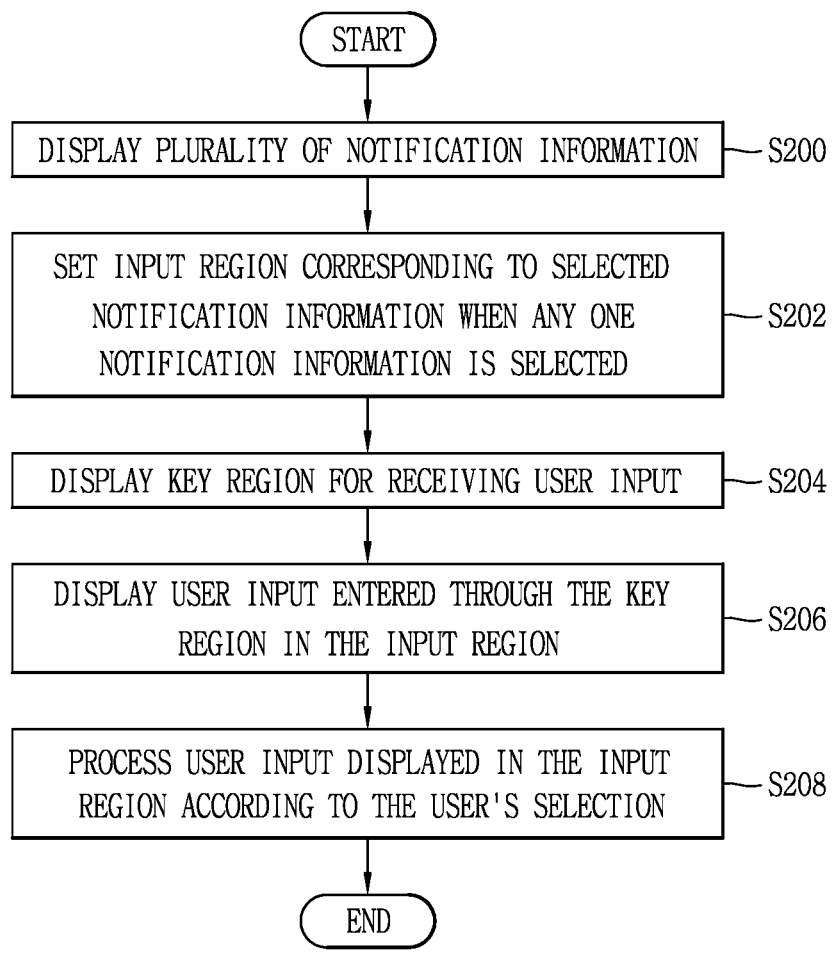
FIG. 2 is a flow chart of an operation process of processing a plurality of notification information according to a user's input applied in a mobile terminal according to an embodiment of the present disclosure.

First, FIG. 2 is a flow chart of an operation process of processing a plurality of notification information according to a user's input applied in the mobile terminal 100 according to an embodiment of the present disclosure. Referring to FIG. 2, the controller 180 of the mobile terminal 100 displays a plurality of notification information on the display unit 151 according to a user's input (S200).

The controller 180 can sense various events occurring on the mobile terminal 100. For example, when various messages such as an SMS or MMS message are received, the controller 180 can sense that an event has occurred. Alternatively, when there is a new e-mail received through a preset user's account, the controller 180 can sense that an event has occurred. Also, when a new post is uploaded to a preset social network service (SNS), the controller 180 can sense it as the occurrence of an event.

In addition, the controller 180 can determine whether or not the event has occurred according to a result of sensing the status change of the mobile terminal 100 (for example, when a battery voltage is reduced below a preset level). The controller 180 can also determine whether or not an event occurs according to a result of performing a specific function or work performed on the mobile terminal 100 (for example, data download, application installation, etc.)

When an event occurs, the controller 180 can display information indicating the event that has occurred on the display unit 151. When a user applies a drag input from one point in a preset region on the display unit 151, the controller 180 can display notification information corresponding to the occurred event on the display unit 151. Here, the notification information may include brief information associated with the event such as a type of the event, a time at which the event was occurred, and the like, thereby allow the user to identify a currently occurring event in an easier and faster manner.

Further, notification information that has been checked by the user among the plurality of notification information can be no longer displayed. However, non-checked notification information can be continuously displayed until it is checked by the user or until a preset condition (for example, initialization due to power on/off or a passage of a preset period of time) is satisfied. Accordingly, when a preset user's input is applied, there may be a plurality of notification information displayed on the display unit 151, and the plurality of notification information may be sorted or classified and displayed according to a preset criteria, for example, an occurrence order of the corresponding events or a type of the event.

Further, the controller 180 can sense a user's selection to any one notification information when the plurality of notification information are displayed as described above. For example, the user's selection may be applied through a touch input to a region on the display unit 151 displayed with any one of the plurality of notification information or a specific graphic object included in the any one notification information.

When any one notification information is selected, the controller 180 can display an input region capable of displaying a user's input applied to the selected notification information (hereinafter, referred to as "first notification information") (S202). The input region can be formed around a region on the display unit displayed with the first notification information.

When an input region is displayed in the step S202, the controller 180 can display a key region capable of applying a user input thereto around the input region (S204). For example, the key region may include a plurality of keys capable of entering characters or symbols. Furthermore, the key region can be displayed in a different region excluding a region displayed with the first notification information on a region around the input region to prevent the first notification information from being hidden due to the display of the key region. For example, the controller 180 can display the input region to be adjacent to a lower end of the region currently displayed with the first notification information, and display the key region to be adjacent to a lower end of the input region. Accordingly, the input region, the key region and the currently selected notification information can all be displayed on the display unit 151.

In the following description, for the sake of convenience of explanation, as illustrated in the foregoing example, an example in which the input region is displayed at a lower end of a region displayed with the first notification information, and the key region is displayed at a lower end of the input region will be described. However, the present disclosure is not limited to this.

As described above, the displayed position of the input region and key region can be determined based on a region on the display unit 151 displayed with the first notification information. In addition, the input region and key region can be set to a region corresponding to the first notification information. In other words, the controller 180 can regard both the input region and key region corresponding to the first notification information as a region displayed with the first notification information. Accordingly, the controller 180 can display the input region and key region in a space between the first notification information and second notification information displayed subsequent to the first notification information.

In addition, the controller 180 can display the key region in a preset region on the display unit 151. In this instance, the controller 180 can partition the display unit 151 into a plurality of regions, and display a plurality of notification information (first region), the first notification information and the input region, and the key region (second region) in the partitioned regions.

The controller 180 can also display currently selected notification information, namely, first notification information, in the second region. Furthermore, the controller 180 can display the input region adjacent to the first notification information, and display the key region adjacent to the input region. A plurality of notification information can also be displayed in the first region. Here, the plurality of notification information displayed in the first region may not include the first notification information, because the first notification information is already displayed in the second region.

When the display unit 151 is partitioned into two regions, the controller 180 can provide a search function for a plurality of notification information displayed in the first region according to a user's input applied to the first region. For example, as part of the search function, the controller 180 can scroll and display the plurality of notification information displayed in the first region according to a user' drag input.

When the input region and key region are displayed adjacent to the first notification information in the steps S202 and S204, the controller 180 can display various user inputs entered through the key region in the input region (S206). In other words, the controller 180 can display a symbol or character entered through the key region in the input region. Accordingly, a character string including at least one character or symbol can be displayed in the input region.

Further, various multimedia contents as well as a character string entered through the key region can be displayed in the input region. For example, when a user selects a multimedia content such as an image or the like, the controller 180 can display information corresponding to the selected multimedia content in the input region. In another example, when the selected multimedia content is an image, the controller 180 can display a thumbnail image generated from the image in the input region. When a video content is selected, the controller 180 can extract a still image or images from the selected video content, and display a thumbnail image generated from the extracted still image or images in the input region.

Further, when various inputs applied from a user are displayed in the input region as described above, the controller 180 can process information entered into the input region as a user input to the first notification information according to the user's selection (S208). In other words, the controller 180 can enter the information of the input region as an input to a function or application of the mobile terminal 100 corresponding to the first notification information in the step S208. Furthermore, the controller 180 can process the entered information according to a function or application corresponding to the first notification information.

Accordingly, if the first notification information is associated with the reception of a previously received specific message, then information entered into the input region can transmit the specific message as a reply message to the sender. Alternatively, if the first notification information is associated with a previously received specific email, then information entered into the input region can be sent as a reply mail of the specific email. Alternatively, if the first notification information is to notify a new post uploaded to a specific SNS server, then information of the input region may be uploaded to the SNS server as a comment for the post.

Hereinafter, various examples in which a plurality of notification information are processed according to a user's input applied to the plurality of notification information, respectively, in the mobile terminal 100 according to an embodiment of the present disclosure will be described in more detail with reference to a plurality of exemplary views.

Figure 3:
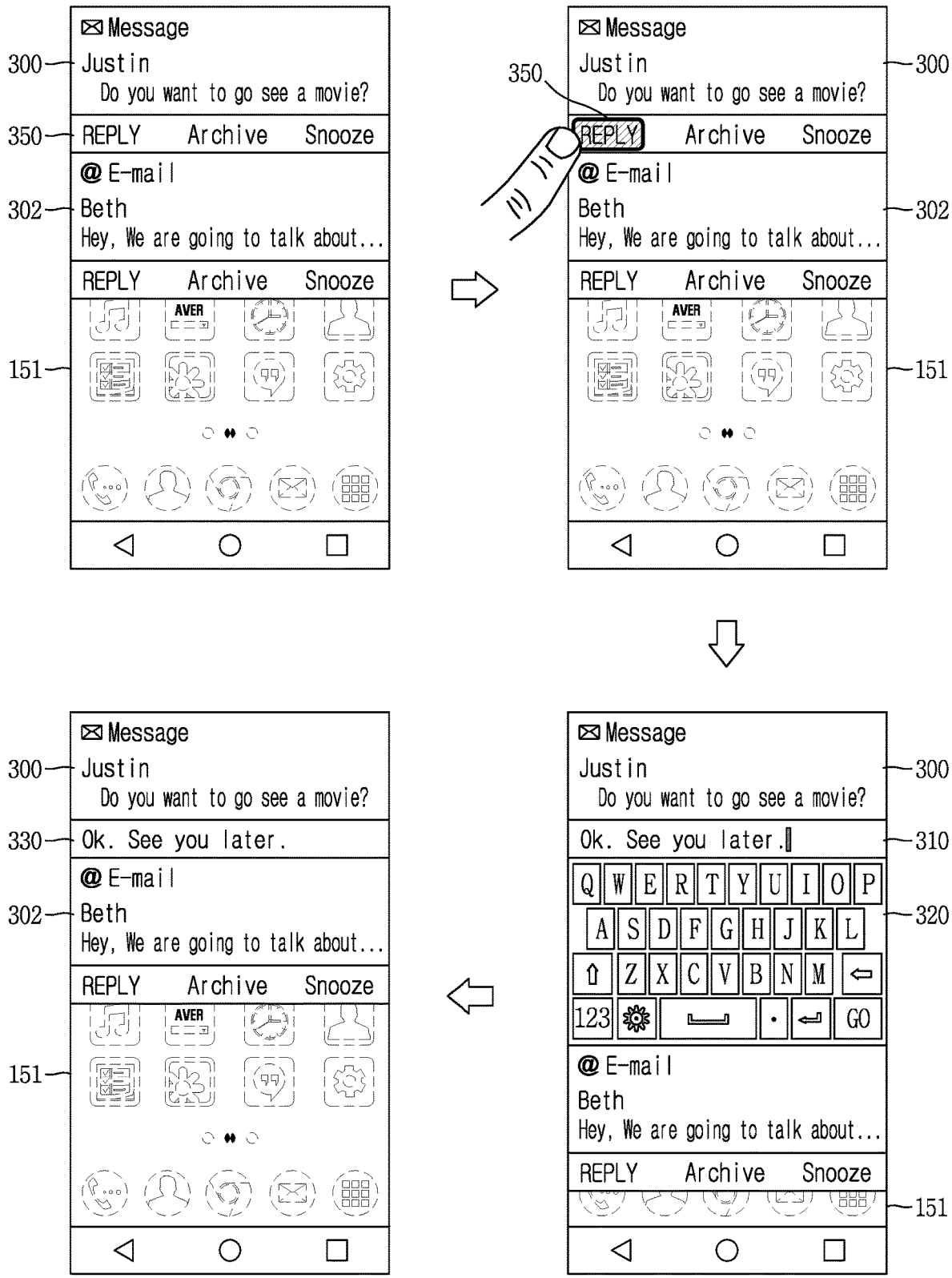
FIG. 3 is a view illustrating an example in which a user input is applied to any one of a plurality of notification information in a mobile terminal according to an embodiment of the present disclosure.

In particular, FIG. 3 is a view illustrating an example in which a user input is applied to any one of a plurality of notification information in the mobile terminal 100 according to an embodiment of the present disclosure. A first drawing of FIG. 3 illustrates an example in which a plurality of notification information (first notification information 300, second notification information 302) are displayed in the mobile terminal 100 according to an embodiment of the present disclosure.

The controller 180 can sense a user's input for selecting any one notification information. For example, when a user's touch input is applied to any one of the plurality of notification information, the controller 180 can sense that the any one notification information is selected by the user.

Alternatively, the controller 180 can sense whether or not notification information is selected according to whether or not there is a user's input to a preset graphic object 350 included in the notification information to distinguish the check of the notification information from the selection of the notification information. In other words, when a user's touch input is sensed on either one of regions on the display unit 151 displayed with the first notification information 300 or the second notification information 302, the controller 180 can determine that the user has checked either one notification information. Then, the controller 180 can end the display of notification information that has been checked by the user.

However, when the user's touch input is applied to the preset graphic object 350 included in the notification information, the controller 180 can determine that the touch input is to select specific notification information. In other words, as illustrated in a second drawing of FIG. 3, when a user's touch input is applied to the graphic object 350 included in the first notification information 300, the controller 180 can determine that the first notification information 300 is selected by the user.

When either one notification information is selected as described above, the controller 180 can display an input region for displaying a user input and a key region for receiving the user input in a region adjacent to the selected notification information. In other words, as illustrated in a third drawing of FIG. 3, the controller 180 can display an input region 310 subsequent to the currently selected first notification information 300, and display a key region 320 subsequent to the input region 310. Accordingly, the input region 310 and key region 320 can be displayed adjacent to the first notification information 300.

In this instance, the controller 180 can set a region displayed with the input region 310 and key region 320 corresponding to the first notification information 300 to a region displayed with the first notification information 300. Accordingly, as illustrated in the third drawing of FIG. 3, the input region 310 and key region 320 can be displayed between the first notification information 300 and the second notification information 302.

Further, the controller 180 can receive a user's input through the key region 320 and display the user's input applied through the key region 320 in the input region 310. Accordingly, as illustrated in the third drawing of FIG. 3, a character string including a plurality of characters or symbols applied through the key region 320 can be displayed in the input region 310. Furthermore, the input can be processed as an input to the first notification information 300 according to the user's selection.

A fourth drawing of FIG. 3 illustrates an example in which a character string entered into the input region 310 is processed as an input to the first notification information 300 as described above. For example, if the first notification information 300 is an incoming message that has not been checked by the user, then a function of the mobile terminal 100 corresponding to the first notification information 300 can be a message function. Accordingly, the controller 180 can enter information (character string) entered into the input region 310 as a message function, and transmit a reply message consisting of a character string entered into the input region 310 to the sender of a non-checked incoming message corresponding to the first notification information 300. As illustrated in the fourth drawing of FIG. 3, the content of the transmitted reply message can be displayed as a processing result 330 of the user input entered to the first notification information 300.

The foregoing description of FIG. 3 illustrates an example in which a position at which the input region 310 and key region 320 are displayed is determined based on a position displayed with the first notification information 300. However, the controller 180 can also display the input region 310 and key region 320 in a preset region on the display unit 151.

Figure 4:
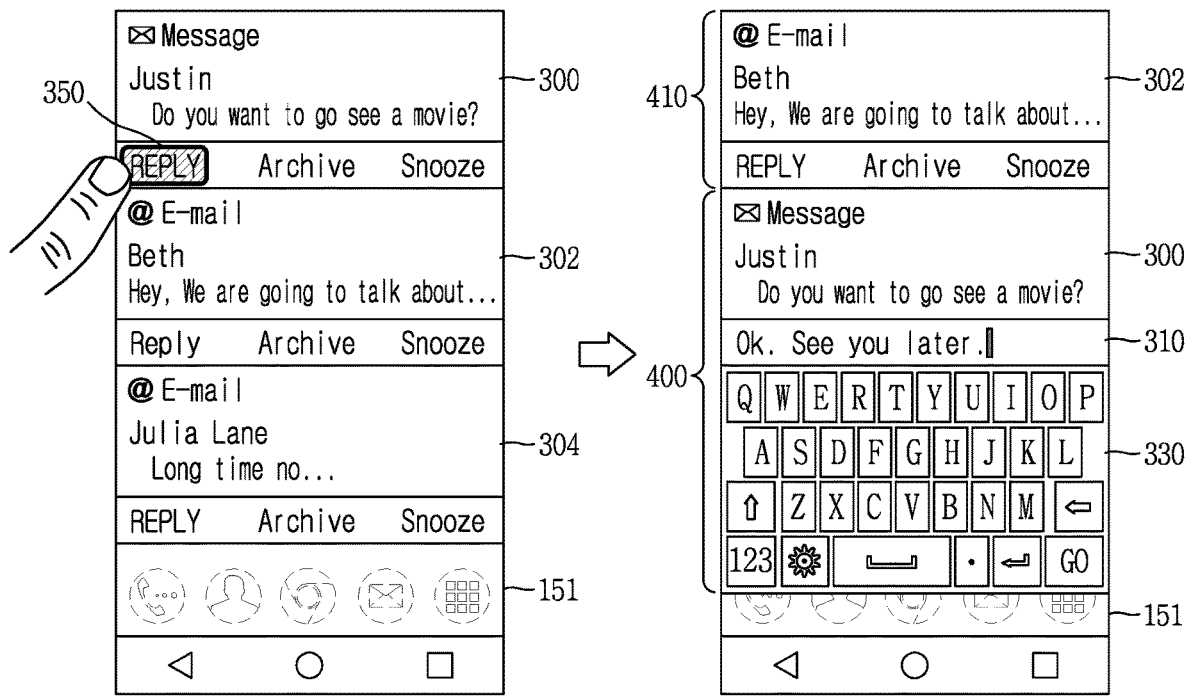
FIG. 4 is a view illustrating an example in which an input region and a key region are displayed in a preset region in a mobile terminal according to an embodiment of the present disclosure.
Figure 4:
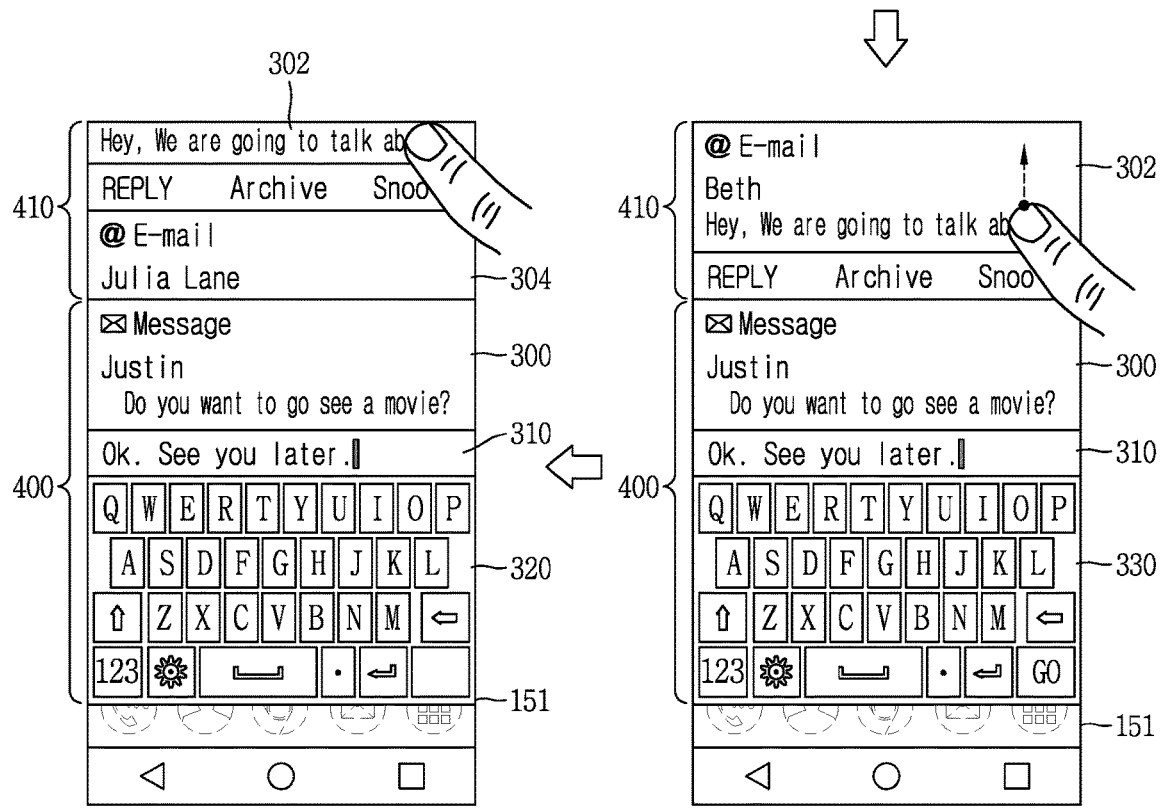

FIG. 4 is a view illustrating an example in which an input region and a key region are displayed in a preset region in the mobile terminal 100 according to an embodiment of the present disclosure. A first drawing of FIG. 4 illustrates an example in which a plurality of notification information 300, 302, 304 are displayed. In this state, when a user's input is applied to the graphic object 350 corresponding to the first notification information 300 as illustrated in the first drawing of FIG. 4, the controller 180 can sense that the first notification information 300 is selected by the user.

When any one notification information is selected as illustrated in the first drawing of FIG. 4, the controller 180 can partition the display unit 151 into a plurality of regions. Furthermore, the plurality of regions, respectively, can be different individual regions to display different information.

For example, currently selected notification information, namely, the first notification information 300, and the input region 310 and key region 320 corresponding to the first notification information can be displayed in any one region (hereinafter, first region 400) among the plurality of regions. Furthermore, a plurality of notification information can be displayed in a different region (hereinafter, second region 410) from the first region 400. Thus, the controller 180 can generate a control image based on a preset size of the key region 320 and a size of the input region 310, and a size of the region displayed with the first notification information 300. Furthermore, the controller 180 can generate the remaining region on the display unit 151 excluding the first region 400 as the second region 410. A second drawing of FIG. 4 illustrates an example of the display unit 151 partitioned into the first region 400 and second region 410 as described above.

In addition, currently selected first notification information 300, input region 310 and key region 320 can be displayed in the first region 400 as described above. The input region 310 can also be displayed adjacent to the first notification information 300 to indicate that a displayed character string is associated with the first notification information 300. At least one key for generating a character string entered into the input region 310 can also be entered through the key region 320. Here, the key region 320 can be displayed adjacent to the input region 310 to indicate that the key region 320 corresponds to the input region 310.

Further, the second region 410 can display at least one notification information. The notification information displayed through the second region 410 may also not include currently selected notification information, namely, first notification information 300, because the first notification information 300 is displayed through the first region 400, and thus the same notification information is not displayed in both the first region 400 and second region 410.

The controller 180 can also change notification information displayed through the second region 410 according to a user's input applied to the second region 410. In other words, when the user applies a drag input in a specific direction when the user has applied a touch input to one point on the second region 410, the controller 180 can change notification information displayed through the second region 410 according to a direction in which the drag input is applied.

Accordingly, as illustrated in a third drawing of FIG. 4, when a drag input is applied in an upward direction when second notification information is displayed in the second region 410, the controller 180 can scroll notification information displayed through the second region 410 in an upward direction according to the drag input. Accordingly, third notification information 304 that is not shown in the third drawing of FIG. 4 can be displayed in the second region 410 as illustrated in a fourth drawing of FIG. 4.

The foregoing description has described when a user selects any one notification information from a plurality of notification information as an example, but the user can also select another notification information when the any one notification information is selected.

Figure 5A:
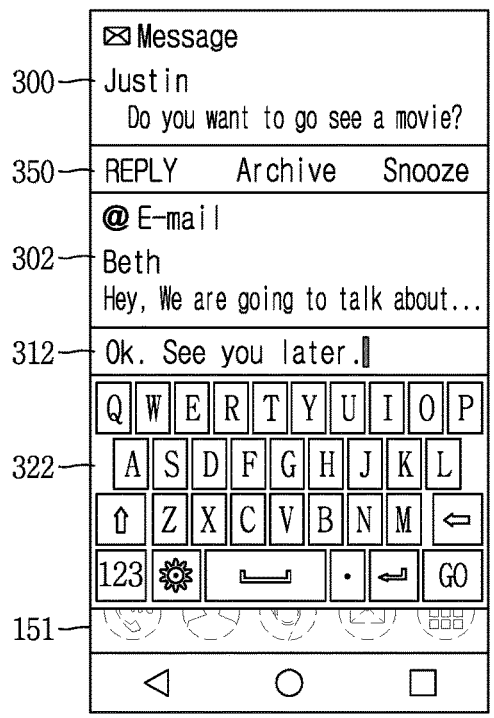
FIGS. 5A, 5B and 6 are views illustrating an example in which a user input to any one notification information is applied when a user input to another notification information is applied in a mobile terminal according to an embodiment of the present disclosure.
Figure 5A:
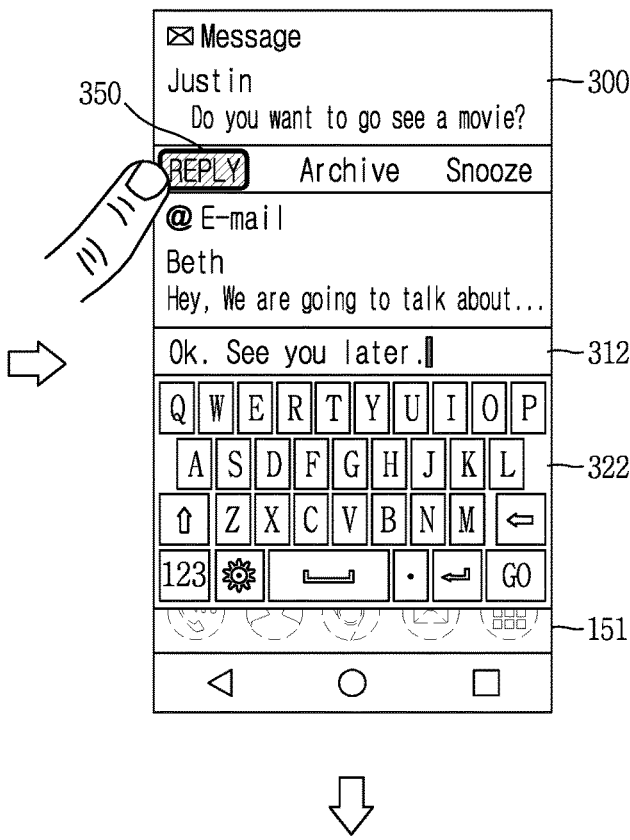
Figure 5A:
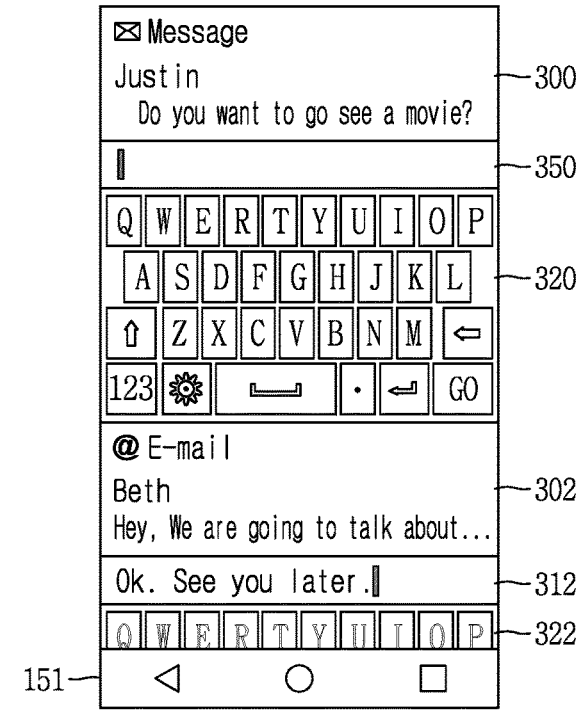
Figure 5B:
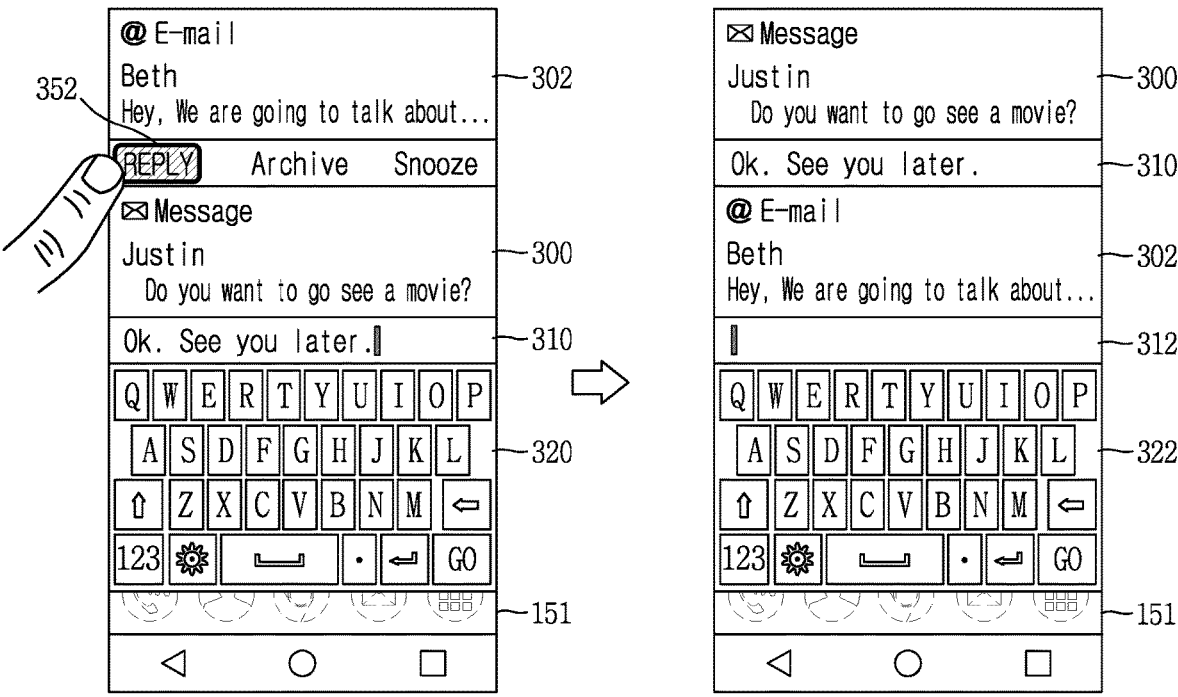
Figure 5B:
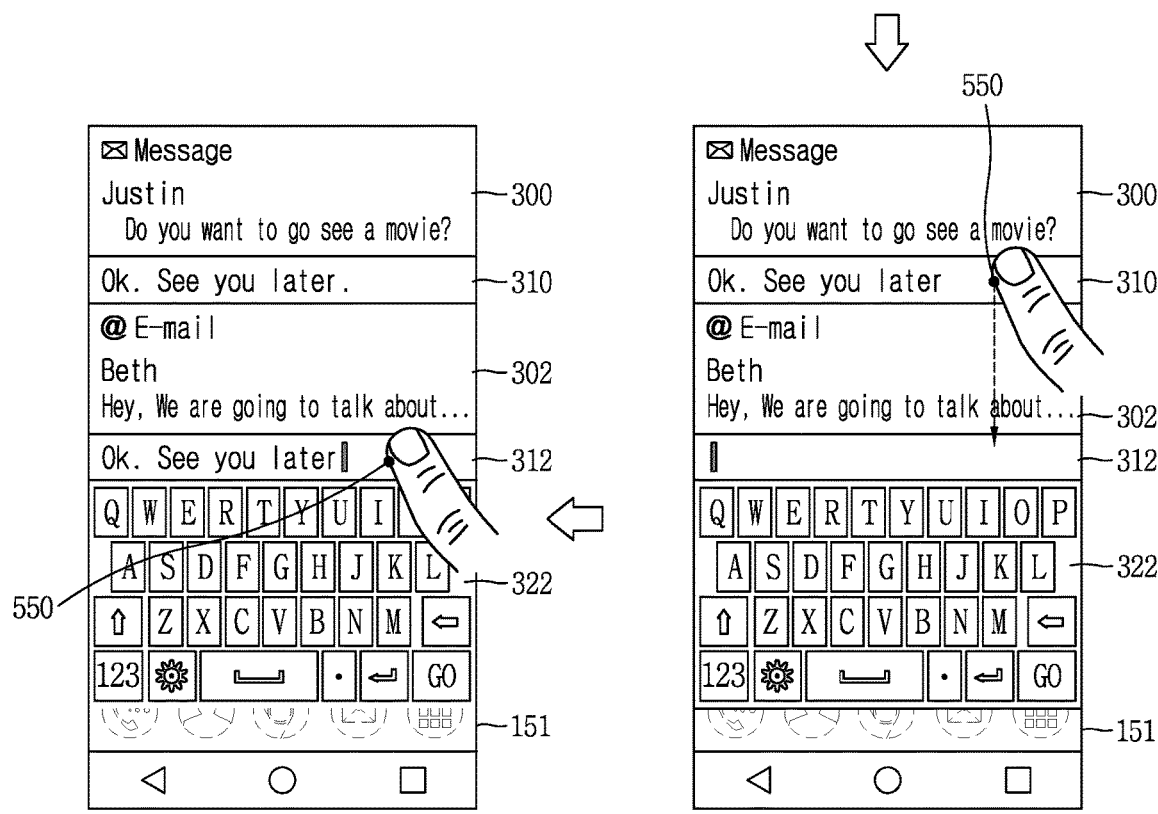
Figure 6:
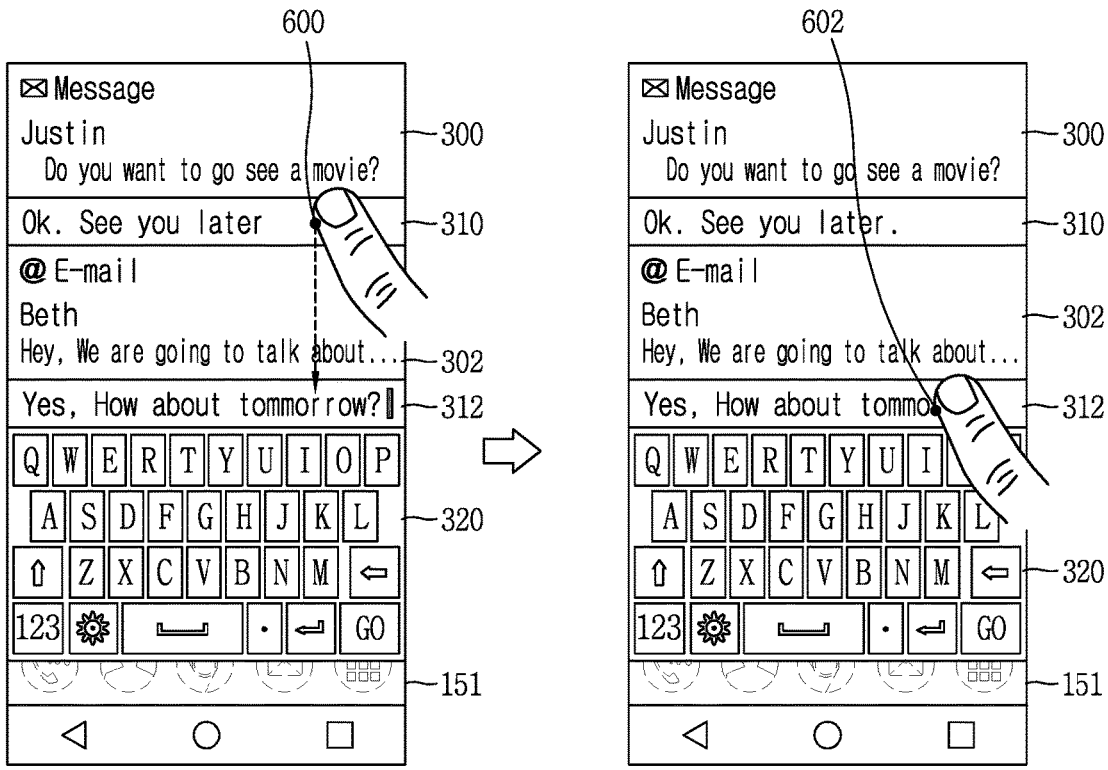
Figure 6:
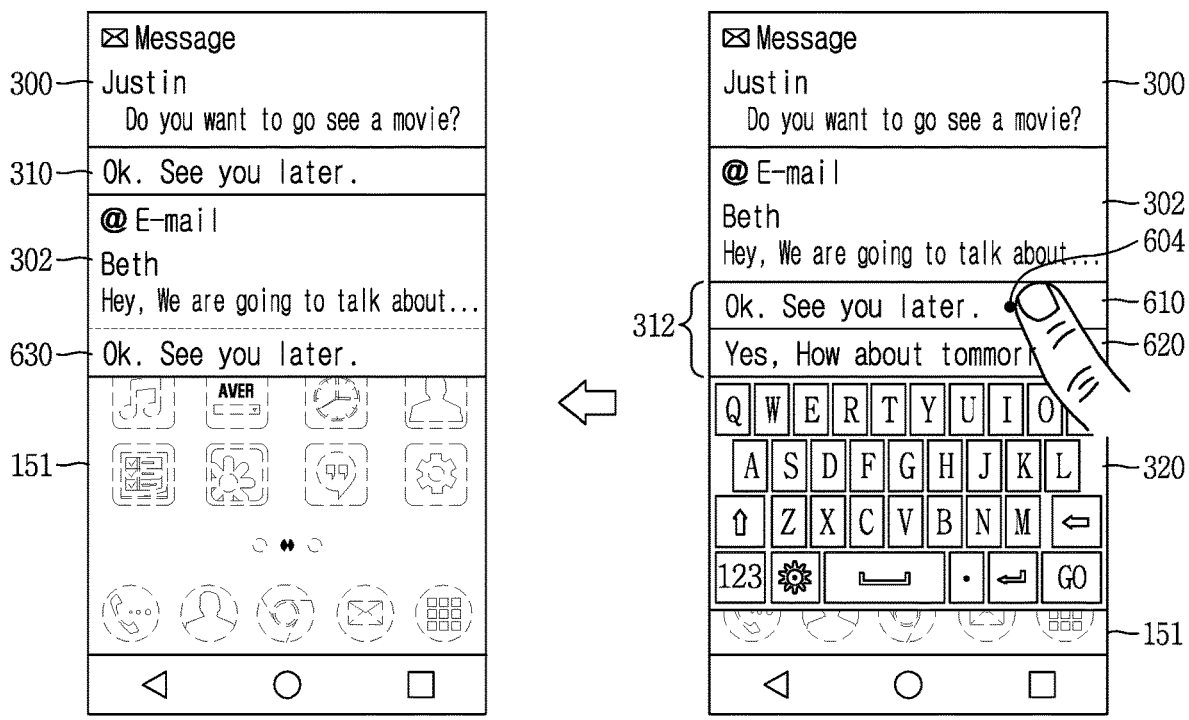

In particular, FIGS. 5A, 5B and 6 are views illustrating an example in which a user input to any one notification information is applied when a user input to another notification information is applied as described above, in the mobile terminal 100 according to an embodiment of the present disclosure. In particular, FIG. 5A is a view illustrating an example in which a user input to any one notification information is applied when a user input to another notification information is applied, in the mobile terminal 100 according to an embodiment of the present disclosure.

A first drawing of FIG. 5A illustrates an example in which a user selects the second notification information 302 when the first notification information 300 and second notification information 302 are displayed. Accordingly, the controller 180 can display a second input region 312 adjacent to the second notification information 302, namely, that corresponds to the second notification information 302 subsequent to the second notification information 302, and display a second key region 322 in a region adjacent to the second input region 312 as illustrated in the first drawing of FIG. 5A.

When a user applies a touch input to the graphic object 350 as illustrated in a second drawing of FIG. 5A when the second input region 312 and second key region 322 according to the selection of the second notification information 302 are displayed as described above, the controller 180 can determine that the user further selects the first notification information 300 corresponding to the graphic object 350.

Then, the controller 180 can display the input region (first input region 310) and key region (first key region 320) corresponding to the first notification information 300 on the display unit 151. In other words, as illustrated in a third drawing of FIG. 5A, the controller 180 can display the first input region 310 adjacent to the first notification information 300, and display the first key region 320 adjacent to the first input region 310.

In this instance, the controller 180 can regard a region on the display unit 151 in which the first notification information 300, the first input region 310 and the first key region 320 are all displayed as a region displayed with the first notification information 300. Accordingly, as illustrated in the third drawing of FIG. 5A, the first notification information 300, the first input region 310 and the first key region 320 can be displayed and then the second notification information 302 can be displayed, and the second input region 312 can be displayed adjacent to the second notification information 302, and the second key region 322 can be displayed adjacent to the second input region 312.

As illustrated in the third drawing of FIG. 5A, when currently selected notification information 300, 302 and input regions 310, 312 and key regions 320, 322 corresponding to each notification information are not all displayed on the display unit 151, the controller 180 can also provide a scroll function. Accordingly, the controller 180 can display other notification information that are not currently displayed on the display unit 151, and an input region and a key region corresponding to the notification information on the display unit 151 according to the user's drag input.

Further, FIG. 5B is a view illustrating another example in which a user input to any one notification information is applied when a user input to another notification information is applied, in the mobile terminal 100 according to an embodiment of the present disclosure. A first drawing of FIG. 5B illustrates an example in which the first notification information 300 is selected by the user. Accordingly, the first drawing of FIG. 5B illustrates an example of the first input region 310 displayed adjacent to currently selected notification information, namely, the first notification information 300, the first key region 320 displayed adjacent to the first input region 310, and a character string entered into the second input region 312 through the first key region 320.

Further, the controller 180 can sense a user's input to a graphic object 352 corresponding to any one notification information when the user's input to another notification information is applied as described above. Then, the controller 180 can determine that the second notification information 302 is further selected while the user applies an input to the first notification information 300.

In this instance, the controller 180 can display notification information additionally selected by the user, namely, an input region and a key region corresponding to the second notification information 302 on the display unit 151. Furthermore, the controller 180 can further display information associated with the first notification information 300 including a character string previously entered from the user on the display unit 151 while at the same displaying the input region and key region corresponding to the further selected notification information (second notification information 302) on the display unit 151 as illustrated in the second drawing of FIG. 5B.

For example, information associated with the first notification information 300 may include the first notification information 300, and the first input region 310 in which a character string currently entered to the first notification information 300 is displayed as illustrated in the second drawing of FIG. 5B. In this instance, the controller 180 can display the first notification information 300 and the additionally selected second notification information 302 subsequent to the first input region 310, and the second input region 312 corresponding to the second notification information, and the second key region 322 for receiving a user's input at the second input region 312 on the display unit 151.

In other words, when any one notification information is further selected when another notification information is selected, the controller 180 can display firstly selected notification information, an input region corresponding to the firstly selected notification information, and the additionally selected notification information and an input region corresponding to the additionally selected notification information when a key region is displayed as it is, and the key region as illustrated in the above FIG. 5A.

However, contrary to the above FIG. 5A, the firstly selected notification information may display only the content of notification information and an input region corresponding to the firstly selected notification information, and display the content of the additionally selected notification information, an input region corresponding to the additionally selected notification information, and a key region adjacent to the firstly selected notification information and input region. The second drawing of FIG. 5B illustrates such an example.

Furthermore, as illustrated in the second drawing of FIG. 5B, when a user's input previously entered into the first notification information 300 through the first input region 310 is displayed, the controller 180 can receive the user's input previously entered into the first notification information 300 as a user's input to the additionally selected second notification information 302 according to a preset user's input. A third drawing and a fourth drawing of FIG. 5B illustrate such an example.

Referring to the third drawing of FIG. 5B, the controller 180 can sense a user's preset first input applied to the first input region 310. For example, the first input may be an input maintaining a touch input state for more than a preset period of time at the same point or a touch input applied at a pressure above a preset pressure. When such a first pressure is applied, the controller 180 can copy at least one character or symbol corresponding to a character string displayed in an input region to which the first input is applied, namely, the first input region 310.

Further, the controller 180 can sense a user's second input applied subsequent to the user's first input. For example, the second input may be a drag-and-drop input that is dragged from a point at which the first input is applied to the first input region 310, and dropped to one point within the display unit 151 displayed with the second input region 312. Then, the controller 180 can enter at least one character or symbol copied from the first input region 310 into the second input region 312. Accordingly, as illustrated in the fourth drawing of FIG. 5B, a character string displayed in the first input region 310 may be entered and displayed in the second input region 312.

When a user's input is applied to the second input region 312, the controller 180 can process the applied user's input as an input to the second notification information 302. In this instance, the user's input applied to the second input region 312 may be a character string copied from the first input region 310, and accordingly, the user's input previously entered into the first input region 310 may be processed as a user's input to the second notification information 302.

Further, FIG. 5B illustrates an example in which a user's input previously entered into the first input region 310 can be processed as a user's input to the second notification information 302 when there in no user's input previously entered into the second input region 312 as illustrated in the third drawing of FIG. 5B, but on the contrary, when there is a user's input previously entered into the second input region 312, the user's input to the second notification information 302 may be applied.

Next, FIG. 6 illustrates an example in which the user's second input is applied to the second input region 312 when there is a user input previously entered into the second input region 312 as described above. A first drawing of FIG. 6 illustrates an example in which the content of firstly selected notification information and an input region (first input region 310) corresponding to the firstly selected notification information (first notification information 300) are displayed similarly to the second drawing of FIG. 5B, and additionally selected notification information (second notification information 302) is displayed adjacent to the first notification information 300 and the first input region 310. In this instance, the second input region 312 for displaying a user input entered to the second notification information 302 and the second key region 322 to which a user input entered into the second notification information 302 is applied can be displayed on the display unit 151 as illustrated in the first drawing of FIG. 6.

The controller 180 can sense a user's preset first input 600 applied to the first input region 310 as illustrated in the first drawing of FIG. 6. When the first input is applied, the controller 180 can copy at least one character or symbol corresponding to a character string displayed in an input region to which the first input 600 is applied, namely, the first input region 310.

Further, the controller 180 can sense a user's second input 602 applied subsequent to the user's first input 600 as illustrated in the second drawing of FIG. 6. For example, the second input 602 may be a drag-and-drop input applied subsequent to the first input 600 and a drag-and-drop input that is dropped to one point within a region of the display unit 151 displayed with the second input region 312.

When the user's second input 602 is sensed as described above, the controller 180 can check whether or not there is a user input previously entered into the second input region 312, namely, a character string, prior to entering the character string copied from the first input region 310 into the second input region 312. Then, as illustrated in the first and the second drawing of FIG. 6, when there is a user input previously entered into the second input region 312, the controller 180 can display both the character string copied from the first input region 310 and the character string previously entered into the second input region 312 in the second input region 312.

That is, the controller 180 can partition the second input region 312 into a plurality of regions. In other words, as illustrated in a third drawing of FIG. 6, the controller 180 can partition the second input region 312 into two regions 610, 620. Then, the controller 180 can display a character string copied from the first input region 310 in any one region 610 among the partitioned regions, and display a character string previously entered into the second input region 312 in another region 620.

Accordingly, when a user copies a character string previously entered into any one notification information and enters it to an input region corresponding to another notification information when there is a character string previously entered to firstly selected notification information and a character string previously entered to additionally selected notification information, both the copied character string and the character string previously entered to the other notification information can be displayed. Then, it is possible to allow the user to select either one character string.

In other words, as illustrated in the third drawing of FIG. 6, the controller 180 can sense a user's input (for example, touch input 604) for selecting either one of a first region 610 displayed with a character string copied from the first input region 310 and a second region 620 displayed with a character string previously entered into the second input region 312. Then, the controller 180 can determine that a character string entered into either one region to which the touch input 604 is applied is selected by the user. Accordingly, as illustrated in the third drawing of FIG. 6, when the user's touch input 604 is applied to the first region 610, the controller 180 can enter the character string copied from the first input region 310 as an input to the second notification information 302. Then, a function or application corresponding to the second notification information 302 can be controlled to process the entered character string.

Accordingly, when the second notification information 302 is notification information indicating that there is an incoming email, the controller 180 can transmit a reply mail including a character string copied from the first input region 310 to the sender, namely, "Beth", who has sent an email corresponding to the second notification information 302. Then, the controller 180 can display a result of transmitting the reply mail. A fourth drawing of FIG. 6 illustrates such an example.

As illustrated in FIGS. 5A through 6, notification information can be selected when a user's input to specific notification information is applied, and a user's input applied to previously selected notification information can be also applied as an input of additionally selected notification information without displaying an input region and a key region corresponding to the additionally selected notification information.

Figure 7:
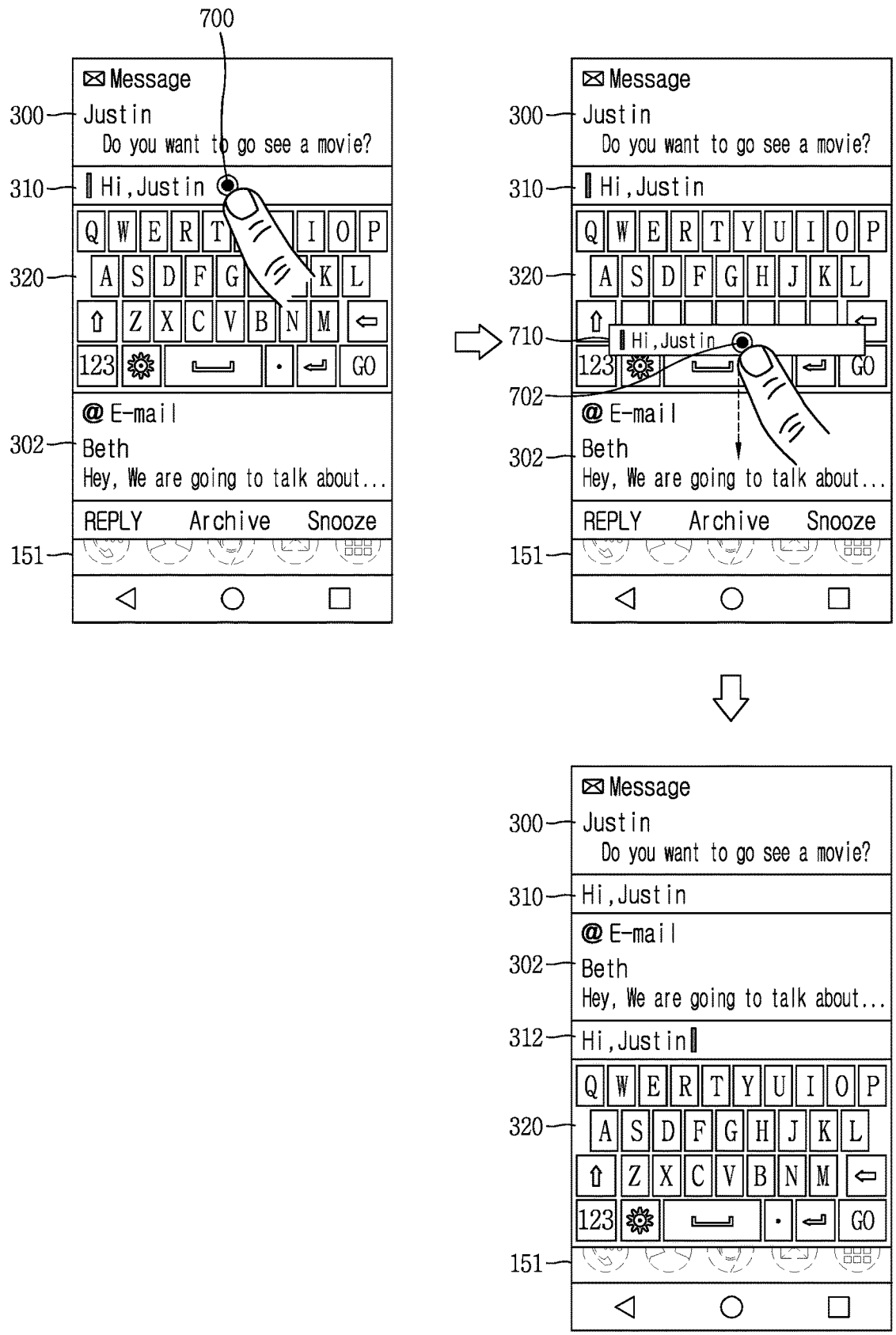
FIG. 7 is a view illustrating an example in which a user input applied to specific notification information is applied as an input to another notification information in a mobile terminal according to an embodiment of the present disclosure.

Next, FIG. 7 is a view illustrating an example in which a user input applied to specific notification information is applied as an input to another notification information in a mobile terminal according to an embodiment of the present disclosure. A first drawing of FIG. 7 illustrates an example in which a user selects any one notification information (first notification information 300) when a plurality of notification information (first notification information 300, second notification information 302) are displayed. In this instance, as described above, the controller 180 can display the first input region 310 for displaying a user's input entered into the currently selected first notification information 300 adjacent to the first notification information 300, and the first key region 320 capable of receiving the user's input adjacent to the first input region 310.

The controller 180 can sense a user's first input 700 applied to the first notification information 300. For example, the first input 700 may be an input in which a touch input is maintained at the same point on the display unit 151 for more than a preset period of time or a touch input applied at a pressure above a preset level. When the first input 700 is sensed, the controller 180 can copy at least one character or symbol corresponding to a character string currently entered into a region corresponding to the first input, namely, the first input region 310.

The controller 180 can sense the user's second input 702 applied subsequent to the first input 700. For example, the second input 702 may be a drag-and-drop input that is dragged from a point at which the first input 700 is applied and dropped to one point on the display unit 151.

When the second input 702 is sensed as described above, the controller 180 can display a currently copied character string, namely, a graphic object 710 corresponding to the first input region 310, on the display unit 151 as illustrated in the drawing of FIG. 7 to allow the user to identify the content of the currently copied character string. Here, the graphic object 710 can be displayed around a point at which a touch for the second input is sensed, namely, a point at which a touch object (for example, user's finger) is brought into contact with the display unit 151, and displayed on a trajectory to which a drag input for the second input is applied.

Further, the controller 180 can drop a character string copied from the first input region 310 to one point on the display unit 151 displayed with another notification information (for example, second notification information 302) according to the second input 702. In this instance, the controller 180 can determine that notification information corresponding to one point on the display unit 151 to which the character string is dropped has been selected by the user. Accordingly, the controller 180 can display notification information to which the character string is dropped, namely, an input region (second input region 312) and a key region (second key region 322) corresponding to the second notification information 302 adjacent to the second notification information 302, on the display unit 151. A third drawing of FIG. 7 illustrates such an example.

The third drawing of FIG. 7 illustrates an example in which the second input region 312 and second key region 322 corresponding to the second notification information 302 are displayed. As shown, a same character string as that displayed in the first input region 310 is entered into the second input region 312, because a character string entered into the first input region 310 is entered as it is into the second input region 312 by the second input 702 as illustrated in the second drawing of FIG. 7.

When the user completes an input, the controller 180 can enter and process a character string currently entered into the second input region 312, namely, a character string same as that entered into the first input region 310, to a function or application corresponding to the second notification information 302.

The foregoing description has described an example in which each notification information is individually selected according to a user's selection, but the present disclosure is not limited to this. In other words, the present disclosure can select a plurality of notification information at the same time, and enter an input applied from the user to the selected plurality of notification information at the same time.

Figure 8:
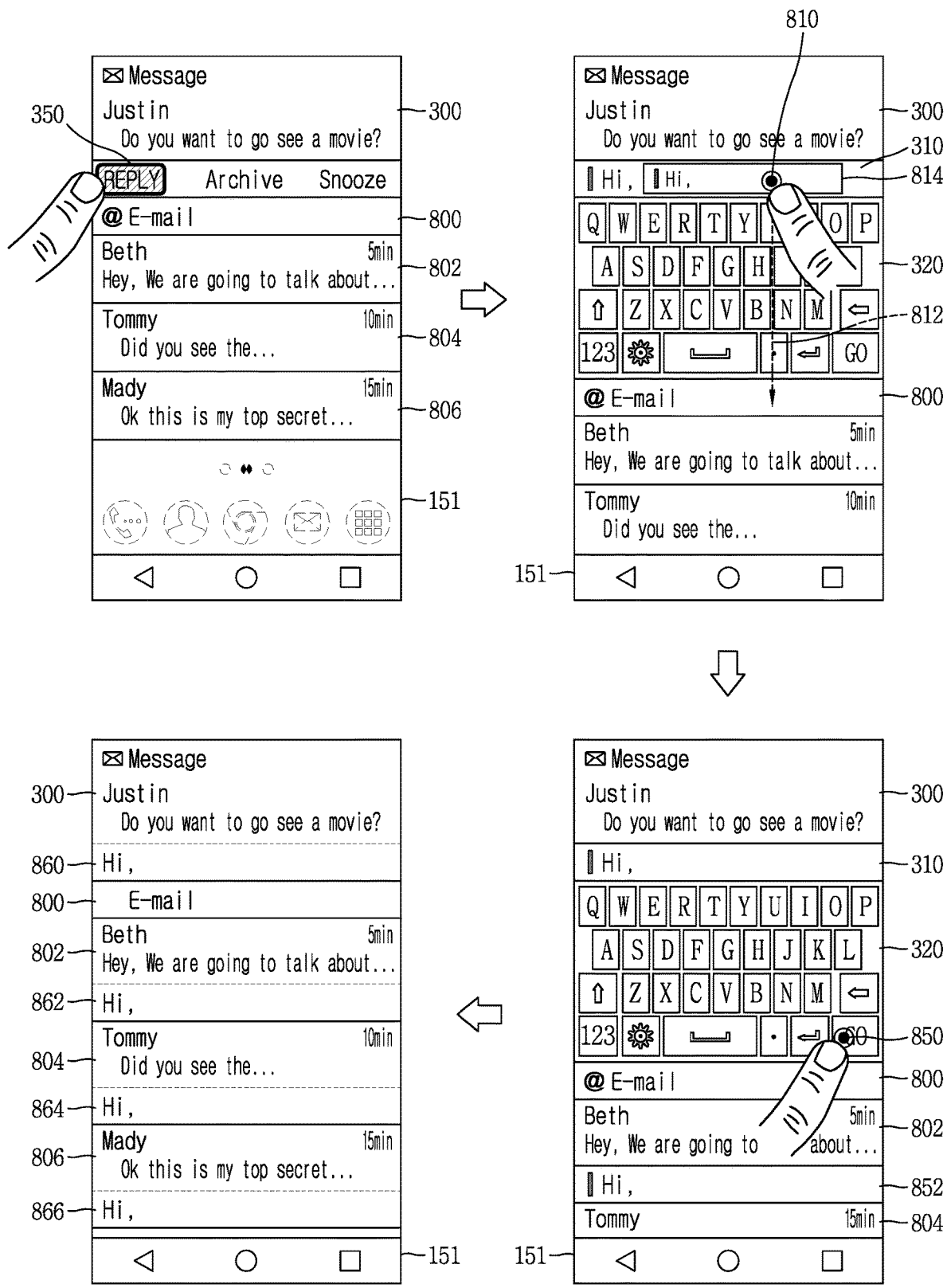
FIG. 8 is a view illustrating an example in which a user input is applied at the same time to a plurality of notification information belonging to one group in a mobile terminal according to an embodiment of the present disclosure.

Hereinafter, FIGS. 8 through 12 illustrate examples in which a plurality of notification information are selected at the same time in the mobile terminal 100 according to an embodiment of the present disclosure. First, FIG. 8 is a view illustrating an example in which a user input is applied at the same time to a plurality of notification information belonging to one group in the mobile terminal 100 according to an embodiment of the present disclosure.

A first drawing of FIG. 8 illustrates an example in which a plurality of notification information are displayed on the display unit 151. The notification information may be sorted and displayed according to a preset criteria as described above. For example, when a user sorts notification information according to a time order, the plurality of notification information may be sequentially sorted and displayed according to a temporal order in which an event corresponding to each notification information has occurred. When the user set them to be sorted according to the type of notification information, the plurality of notification information may be classified and displayed according to the corresponding type of the event.

Here, the corresponding type of the event may be an application or function associated with each event. In other words, the controller 180 can divide the plurality of notification information into notification information corresponding to an event associated with a message function (for example, message incoming event), notification information corresponding to an event associated with an email function (for example, email incoming event) or an event associated with the status of the mobile terminal 100 (for example, notification information associated with a battery state or WiFi access state, etc.), and the like. Furthermore, the controller 180 can display the divided notification information into each group to allow the plurality of notification information to indicate a state divided according to the type.

When notification information are divided and displayed into each group as described above, the controller 180 can display a name corresponding to each group to allow the user to clearly identify each group. In other words, as illustrated in the first drawing of FIG. 8, the controller 180 can divide and display currently generated notification information into notification information 300 associated with a message function and notification information 802, 804, 806 associated with an email function, and group name information 800 can be displayed in front of the notification information 802, 804, 806 associated with the email function on the display unit 151.

The controller 180 can sense a user's input to any one of notification information displayed on the display unit 151. In other words, when the user's input is applied to any one graphic object 350 for selecting specific notification information, the controller 180 can sense that notification information corresponding to the graphic object 350 has been selected. Furthermore, the controller 180 can display the input region 310 and key region 320 corresponding to the first notification information 300 corresponding to the graphic object 350 on the display unit 151 in response to the user's input to the graphic object 350. A second drawing of FIG. 8 illustrates such an example.

As illustrated in the second drawing of FIG. 8, when specific notification information 300, and the input region 310 and key region 320 corresponding to the specific notification information are displayed, the controller 180 can receive a user's input applied though the key region. Then, the received user input can be displayed in the input region 310, and processed as an input to the corresponding notification information 300 according to the user's selection.

In addition, the controller 180 can sense a user's first input 810 applied to the first input region 310. For example, the user's first input may be an input maintaining a touch input state for more than a preset period of time at the same point or a touch input applied at a pressure above a preset pressure. When the first input 810 is applied, the controller 180 can copy the user's input entered into the first input region 310 in response to the first input 810. The controller 180 can also display a graphic object 814 corresponding to the first input region 310 on the display unit 151 to indicate that the user input from the first input region 310 is in a copied state.

The controller 180 can then sense the user's second input 812 applied subsequent to the first input 810. As shown, the second input 812 can be a drag-and-drop input applied from a point to which the first input 810 is applied to another point on the display unit 151. In other words, the controller 180 can sense the second input 812 applied from one point on the first input region 310 at which the first input 810 is sensed to one point in a region of the display unit 151 displayed with the group name information 800 as illustrated in the second drawing of FIG. 8. When the second input 812 is applied to one point in a region displayed with the group name information 800 as described above, the controller 180 can determine the second input 812 as the user's input to notification information 802, 804, 806 corresponding to the group name information 800.

When there is the user's input applied to the plurality of notification information 802, 804, 806 at the same time as described above, the controller 180 can display the applied user's input on the plurality of notification information 802, 804, 806, respectively. In other words, the controller 180 can display input regions corresponding to the plurality of notification information 802, 804, 806, respectively, and display a character string copied from the first input region 310 to the input regions as illustrated in a third drawing of FIG. 8.

The third drawing of FIG. 8 illustrates only an example in which an input region 852 corresponding to the first notification information 802, and a character string ("Hi") copied from the input region 310 in the input region 852 are displayed according to the limitation of the display region. However, similarly to the input region 852, input regions corresponding to the second notification information 804 and third notification information 806 can all be generated, and the character string ("Hi") copied from the input region 310 can all be displayed in each input region. Accordingly, when the user applies a drag input for scrolling screen information displayed on the display unit 151, input regions corresponding to the second notification information 804 and third notification information 806 can be displayed according to the drag input. Furthermore, a character string copied from the first input region 310 can be displayed in the input regions, respectively.

Thus, when the user's input is applied to input regions corresponding to a plurality of notification information, respectively, the controller 180 can process the applied user's input as an input to each notification information according to the user's selection. In other words, as illustrated in the third drawing of FIG. 8, when a user input 850 for selecting input completion is applied, the controller 180 can process the user's inputs applied to the input regions, respectively, as the user's input corresponding to each notification information. In this instance, the controller 180 can of course display results 860, 862, 864, 866 in which the user's input applied to a plurality of notification information at the same time is processed to correspond to each notification information.

The description of FIG. 8 illustrates when a user input is applied to all of a plurality of notification information corresponding to a specific group selected by the user at the same time, for example, but the user input can be applied to only some of the plurality of notification information selected from the user.

Figure 9:
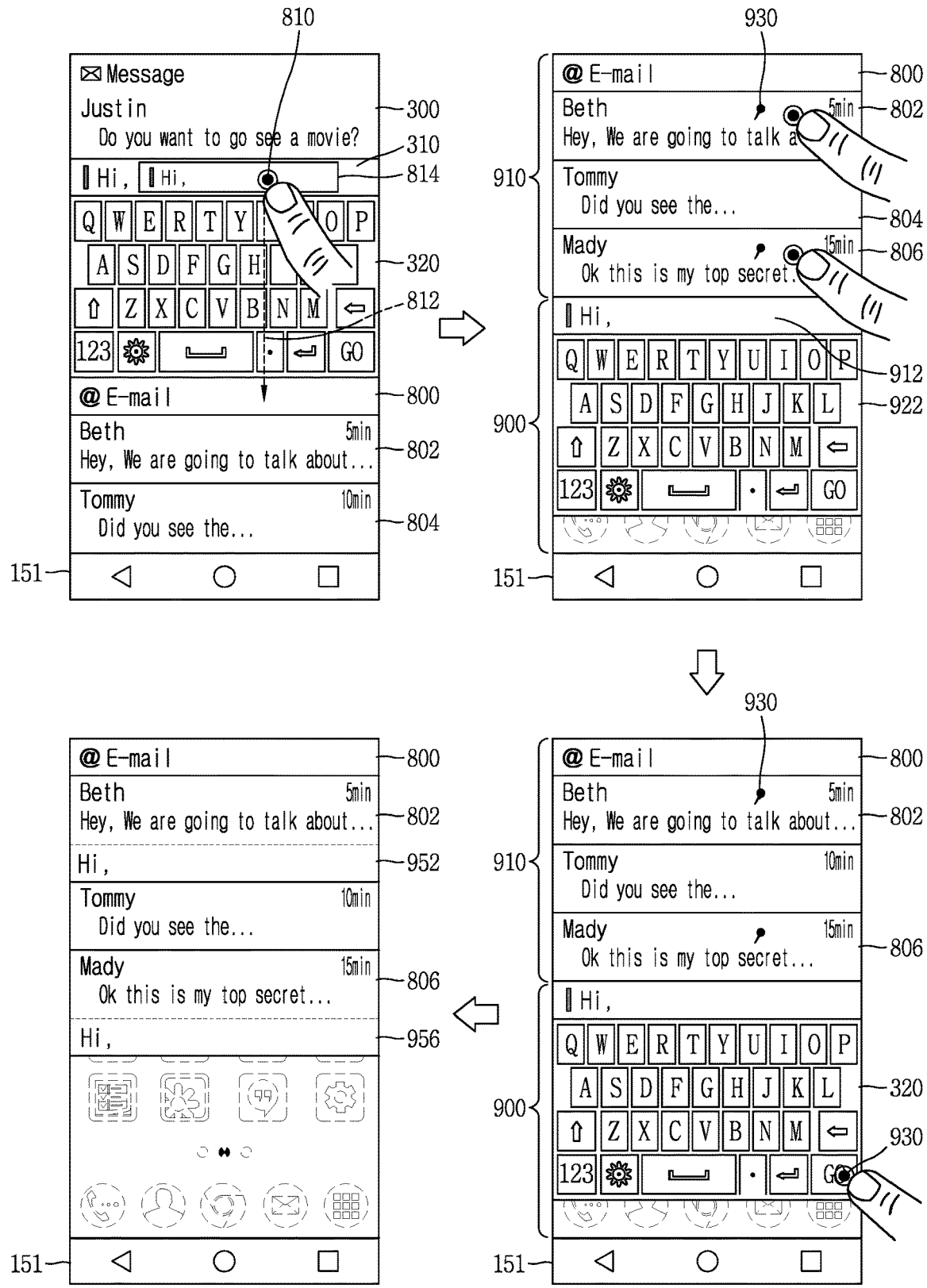
FIG. 9 is a view illustrating an example in which a user input is applied to some of a plurality of notification information that belong to one group according to a user's selection in a mobile terminal according to an embodiment of the present disclosure.

For example, FIG. 9 is a view illustrating an example in which a user input is applied to some of a plurality of notification information that belong to one group according to a user's selection as described above in the mobile terminal 100 according to an embodiment of the present disclosure.

A first drawing of FIG. 9 illustrates a view in which a user's first input 810 applied to the first input region 310, and a second input 812 is applied to one point in a region of the display unit 151 displayed with the group name information 800 in a specific group when any one notification information (first notification information 300), and the first input region 310 and first key region 320 corresponding to the first notification information 300 are displayed. In this instance, the controller 180 can copy a character string entered into the first input region 310 according to the first input 810, and display that the character string is in a copied state through the graphic object 814.

As illustrated in a first drawing of FIG. 9, when the second input 812 is applied to one point in a region of the display unit 151 displayed with the group name information 800 in a specific group, the controller 180 can determine the second input 812 as a user's input to notification information 802, 804, 806 corresponding to the group name information 800. When there is a user's input applied to a plurality of notification information at the same time as described above, the controller 180 can partition a region of the display unit 151 into a first region 900 configured to receive a user input and display the received input and a second region 910 in which notification information 802, 804, 806 belonging to the group name information 800 are displayed as illustrated in a second drawing of FIG. 9.

The first region 900 may include a key region 922 capable of receiving a user's input and an input region 912 in which a user input (for example, character string) applied through the key region 922 is displayed. Furthermore, the input region 912 may include a character string copied from the first input region 310 as illustrated in the second drawing of FIG. 9.

Further, notification information in a specific group selected by the second input 812 can be displayed in the second region 910. In other words, as illustrated in the first drawing of FIG. 9, when the second input 812 is applied to the group name information 800 for displaying that the second input 812 is in an email group, the controller 180 can display the notification information 802, 804, 806 in the second region 910. The controller 180 can also provide a scroll function according to a user's drag input to allow the user to search specific notification information.

Further, the controller 180 can allow the user to select only at least some of the notification information 802, 804, 806 displayed in the second region 910. Here, the controller 180 can determine that notification information to which the user's touch input is applied among a plurality of notification information displayed through the second region 910 is selected by the user. In other words, as illustrated in a second drawing of FIG. 9, when the user makes a touch on the second notification information 802 and fourth notification information 806, the controller 180 can determine that only the second notification information 802 and fourth notification information 806 are selected by the user among the notification information 802, 804, 806 belonging to a currently selected group.

In this instance, the controller 180 can display the user's selected notification information and non-selected notification information in a distinguished manner. For example, the controller 180 can display a region of the display unit 151 displayed with the selected notification information with a different color or brightness or display the region of the display unit 151 displayed with the selected notification information in a distinguished manner using an object such as a preset guideline or the like. Alternatively, as illustrated in the second drawing of FIG. 9, a preset graphic object 930 can be displayed on the selected notification information.

As illustrated in the second drawing of FIG. 9, some of notification information are selected, the controller 180 can receive a user's input through the key region 922 in the first region 900. Then, the user's input applied through the key region 922 can be displayed in the input region 912. When the user selects input completion through the key region 922, the controller 180 can enter at least one character or symbol corresponding to a character string displayed in the input region 912 as an input to the currently selected notification information. Accordingly, the controller 180 can transmit a reply including the character string displayed in the input region 912 in the form of an email to the senders of the email corresponding to the currently selected notification information 802, 804, respectively. Furthermore, a result of transmitting the reply email can be displayed on the display unit 151 as illustrated in a fourth drawing of FIG. 9.

Thus, the mobile terminal 100 according to an embodiment of the present disclosure can apply a user's input to a plurality of notification information at the same time. However, as illustrated in FIGS. 8 and 9, it is possible to enter different inputs corresponding to the plurality of notification information, respectively, at the same time as well as enter the same character string entered from the user to a plurality of notification information at the same time.

Figure 10:
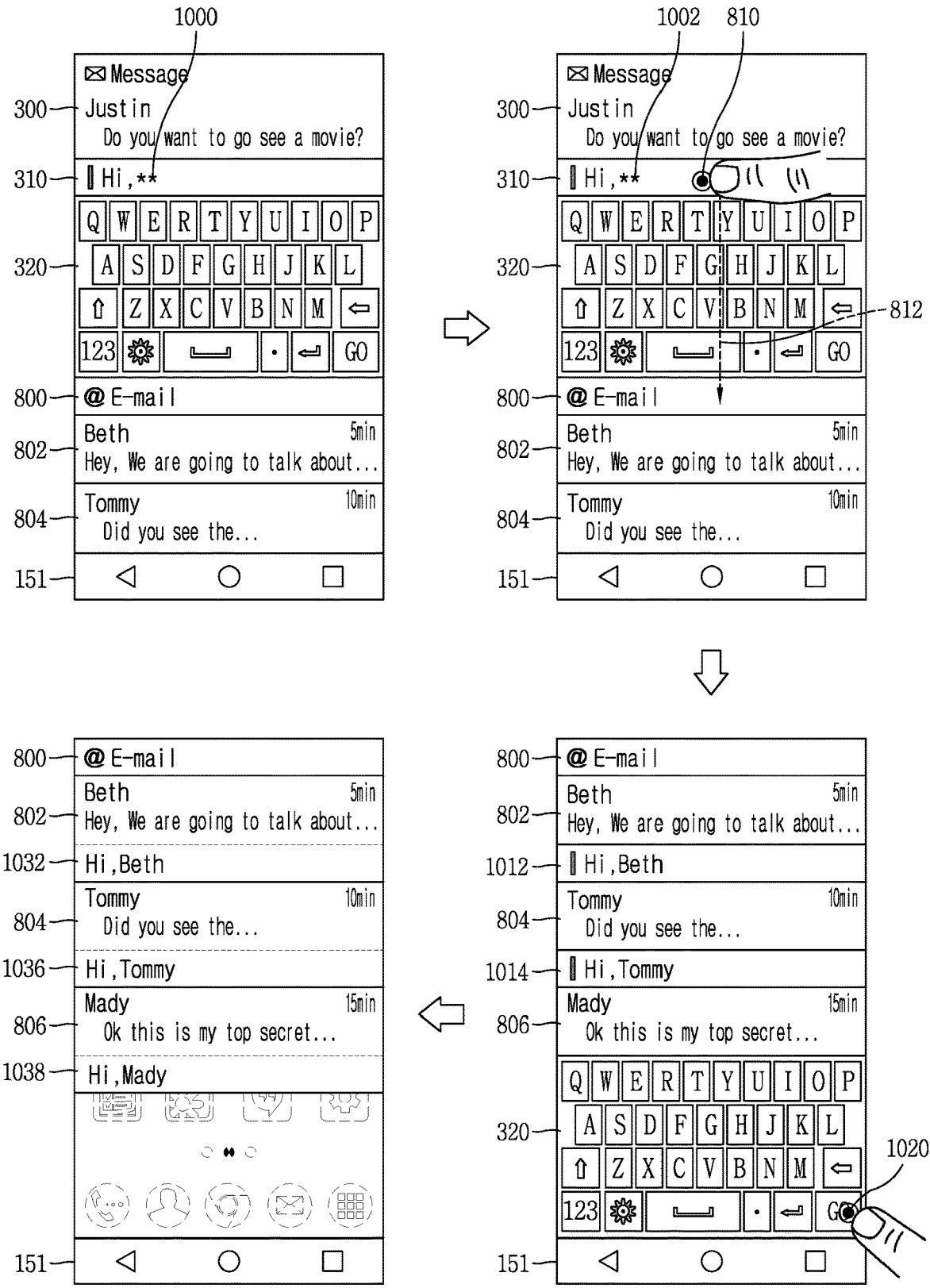
FIG. 10 is a view illustrating an example in which different user inputs are entered at the same time to a plurality of notification information, respectively, in a mobile terminal according to an embodiment of the present disclosure.

Next, FIG. 10 is a view illustrating an example in which different user inputs are entered at the same time to a plurality of notification information, respectively, in the mobile terminal according to an embodiment of the present disclosure.

A first drawing of FIG. 10 illustrates an example of a state in which any one notification information (first notification information 300) and the first input region 310 and first key region 320 corresponding to the first notification information 300 are displayed. Furthermore, the first drawing of FIG. 10 illustrates an example in which a character string 1000 including at least one preset symbol is entered into the first input region 310.

In this state, as illustrated in the second drawing of FIG. 9, when the user's first input 810 is applied to the first input region 310 into which the character string 1000 including the preset symbol is entered, and the second input 812 is applied to one point of the display unit 151 displayed with the group name information 800 of the email group subsequent to the first input 810, the controller 180 can determine that the character string 1000 including the preset symbol is entered into a plurality of notification information, respectively, that belong to the email group.

As described above, when the character string 1000 including a preset symbol is entered, the controller 180 can extract information corresponding to the at least one preset symbol from notification information into which the character string 1000 is entered. For example, as illustrated in FIG. 10, when the character string 1000 includes a preset symbol "**\*\*", the controller 180 can extract the sender information of an email or message as information corresponding to the symbol "\*\*" from the notification information into which the character string 1000** is entered.

Accordingly, as illustrated in a second drawing of FIG. 10, when a group selected by the second input 812 is an email group, the controller 180 can extract information on the sender of an email corresponding to the notification information 802, 804, 806, respectively, based on the character string 1000 entered into the notification information 802, 804, 806, respectively, that belong to the email group. Furthermore, the extracted information may be inserted and displayed instead of the symbol "**\*\*" of the each character string 1000. A third drawing of FIG. 10** illustrates such an example.

When the user selects input completion through the first key region 320, the controller 180 can enter character strings (for example, character strings 1012, 1014) including the sender information extracted from the corresponding each notification information as an input to each notification information (for example, notification information 802, 804) as illustrated in the third drawing of FIG. 10.

When the user selects input completion through the first input region 310, the controller 180 can transmit character strings including the sender information extracted from each notification information 802, 804, 806 in the form of a reply email to the each notification information 802, 804, 806 included in the email group. Furthermore, a result of transmitting the reply email can be displayed on the display unit 151 as illustrated in a fourth drawing of FIG. 10.

Further, there may exist various preset symbols. For example, the symbols can be set to include at least one specific character or symbol according to the user's selection. Each preset symbol can be set to extract specific information from notification information or information associated with the notification information. Also, the information associated with the notification information may include information associated with a state or location of the mobile terminal 100 at the time when an event corresponding to the notification information occurs.

For example, in FIG. 10, extracting sender information from the corresponding notification information when the preset symbol "**" is entered has been described as an example. On the contrary, when a character string including a preset symbol "@@" is entered to a plurality of notification information, the controller 180 can check a time at which each notification information was generated, and insert the location information of the mobile terminal 100 measured at the checked time instead of the symbol "@@". Accordingly, when a character string including the symbol "@@" is entered into a plurality of notification information, the character string including different location information instead of the symbol "@@" may be entered into a plurality of different notification information, respectively.

Further, FIG. 10 illustrates an example in which specific group information is selected by the first input 810, and a character string including the preset symbol is collectively entered to a plurality of notification information belonging to the selected group, but as illustrated in FIG. 9, when only some of the plurality of notification information that belong to the selected group are selected, a character string including the preset symbol can be entered into only the selected some notification information. In this instance, when the user selects input completion, each character string including sender information extracted from the selected some notification information, respectively, can be transmitted in the form of a reply email or message to the selected notification information, respectively.

The foregoing description has described an example in which a specific group is selected by the user's second input, and the user's input is applied at the same time to all notification information included in the selected specific group or some of notification information selected from the user among notification information in a specific group. However, the present disclosure is not limited to this. In other words, according to the present disclosure, a user's input can be applied at the same time to the plurality of notification information, respectively, even though there are a plurality of notification information that does not belong to one group.

Figure 11:
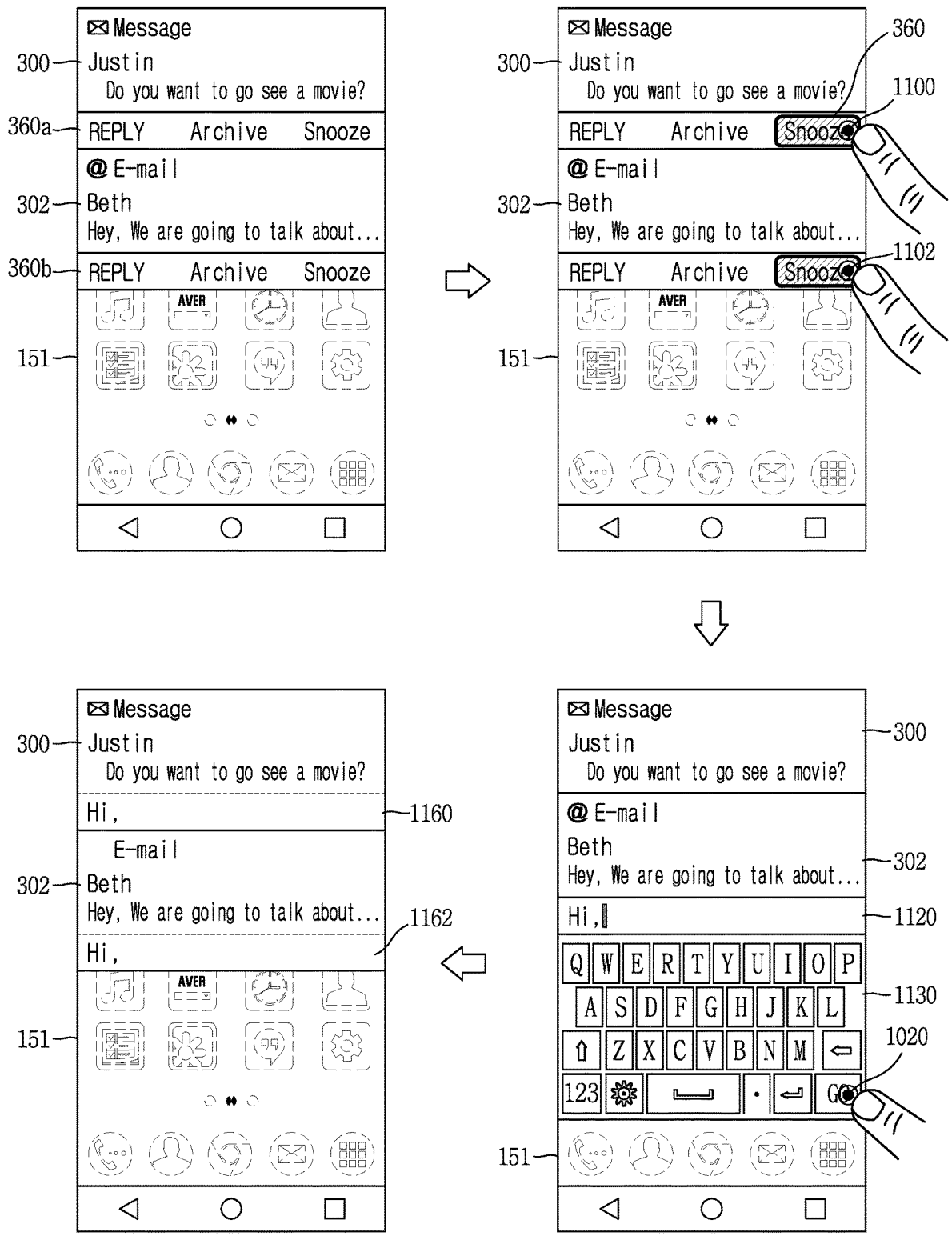
FIGS. 11 and 12 are views illustrating an example in which a user input is applied at the same time to a plurality of notification information in a mobile terminal according to an embodiment of the present disclosure.
Figure 12:
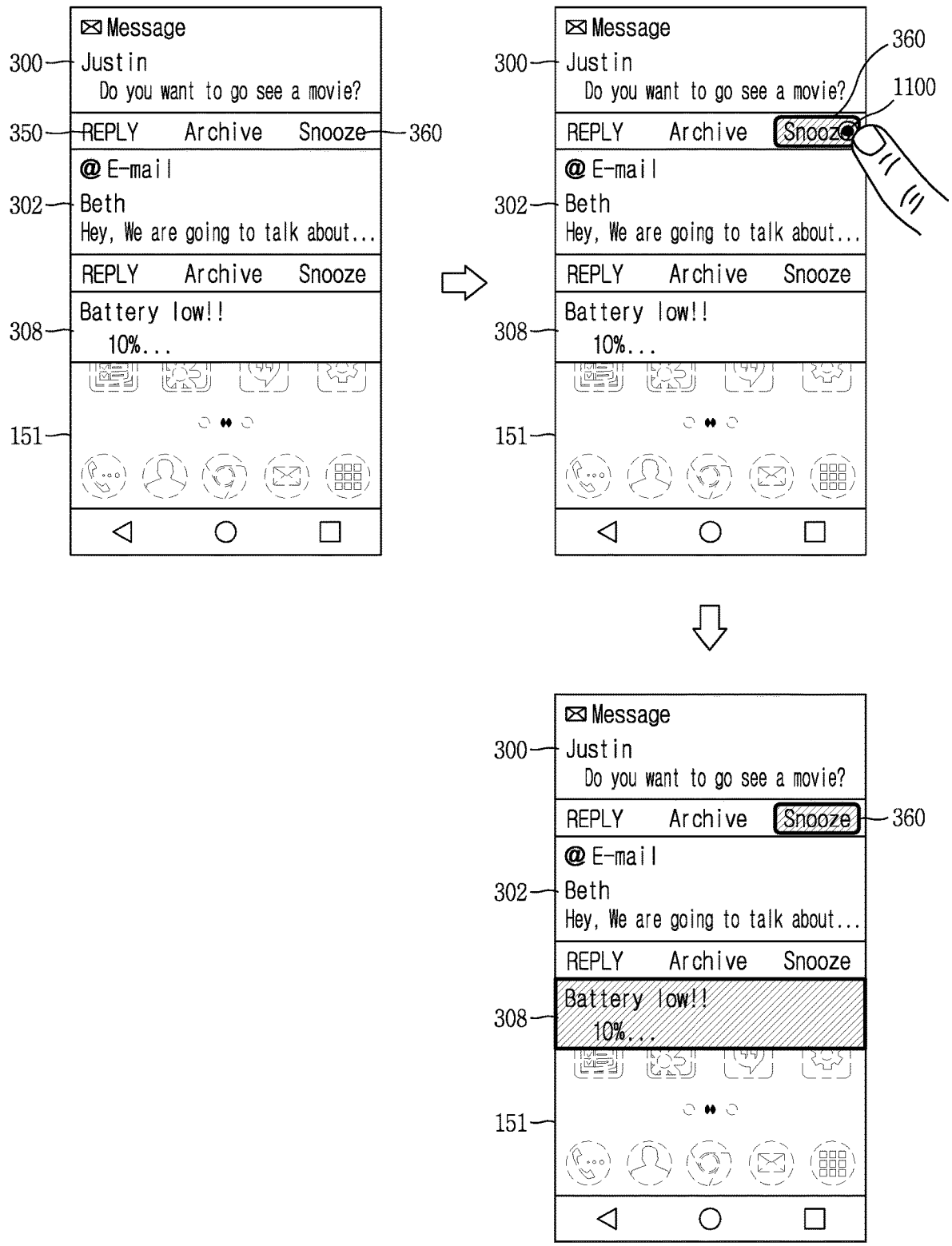

Next, FIGS. 11 and 12 are views illustrating an example in which a user input is applied at the same time to a plurality of notification information in the mobile terminal 100 according to an embodiment of the present disclosure as described above. A first drawing of FIG. 11 illustrates an example in which a plurality of notification information 300, 302 belonging to different groups are displayed. The controller 180 can sense a user's input for selecting notification information to which the user input is applied.

For example, when a preset graphic object 360 is selected by the user among graphic objects included in each notification information, the controller 180 can determine that notification information corresponding to the selected graphic object 360 has been selected. Then, the controller 180 can display the notification information selected by the user to be different from the non-selected notification information, thereby allowing the selected notification information to be distinguished.

For example, the controller 180 can display the preset graphic object 360 selected by the user in a distinguished manner. In other words, as illustrated in the second drawing of FIG. 11, when a first graphic object 360a included in the first notification information 300 and a second graphic object 360b included in the second notification information 302 are selected by the user, the controller 180 can display the first graphic object 360a and second graphic object 360b with different colors or in a distinguished manner through highlight display. Accordingly, the user can identify whether or not notification information is selected according to the display state of the graphic object 360.

The selected notification information can also be displayed in a distinguished manner. For example, as illustrated in FIG. 9, the controller 180 can use a preset graphic object (for example, a graphic object 930 in FIG. 9). In other words, when specific notification information is selected, the controller 180 can display the preset graphic object in a partial region displayed with the notification information, thereby allowing the user to identify whether or not the specific notification information is selected.

Further, the user's inputs 1100, 1102 for selecting the first graphic object 360a and second graphic object 360b can be different from each other. For example, the controller 180 can determine whether or not the selection of notification information has been completed based on the user's input applied to the graphic object 360. For example, the user first selects the first graphic object 360a, and later selects the second graphic object 360b. In this instance, the controller 180 can determine that the user will further select another notification information based on a touch input applied to a region of the display unit 151 displayed with the first graphic object 360a.

In other words, when a period of time during which a touch input applied to the first graphic object 360a is maintained is less than a preset period of time or an intensity of pressure sensed from the touch input is less than a preset intensity, the controller 180 can determine that the selection of notification information has not been completed. However, when a period of time during which a touch input applied to the first graphic object 360a is maintained is above a preset period of time or an intensity of pressure sensed from the touch input is above a preset intensity, the controller 180 can determine that the selection of notification information has been completed. Accordingly, when a period of time during which a touch input applied to the second graphic object 360b is maintained is above a preset period of time or an intensity of pressure sensed from the user's input is above a preset intensity, the controller 180 can determine that the selection of notification information has been completed.

When the selection of notification information has been completed as described above, the controller 180 can display an input region 1120 displayed with a user's input to be applied to the selected notification information, and a key region 1130 capable of receiving the user's input as illustrated in a third drawing of FIG. 11. Furthermore, the controller 180 can display the user's input applied through the key region 1130 through the input region 1120.

When the user selects input completion through the key region 1130, the controller 180 can enter a user input (for example, character string) displayed in the input region 1120 as an input to the currently selected notification information. Accordingly, the controller 180 can transmit a response message including a character string displayed in the input region 1120 to the sender of a message corresponding to the first notification information 300, and transmit a reply email including a character string displayed in the input region 1120 to the sender of an email corresponding to the second notification information 302. Furthermore, a result of transmitting the response message and reply email can be displayed on the display unit 151 as illustrated in a fourth drawing of FIG. 11.

According to the foregoing description, the controller 180 of the mobile terminal 100 according to an embodiment of the present disclosure can generate and display notification information corresponding to various events, respectively, to notify the events occurring on the mobile terminal 100 to the user. However, there may be various types of events. For example, an event may occur according to the reception of a message or email or when a new post is uploaded to a preset SNS, and the resultant event may occur. Furthermore, in case of an event for the reception of a message or email or a post uploaded to the SNS as described above, notification information corresponding to each event may be one associated with a message function, an email functioning or an SNS function. In addition, the functions (message function, email function or SNS function) may perform processing (for example, response message or reply mail or comment upload, etc.) on an input (for example, character string) applied from the user associated with a currently occurring event.

The event may be associated with a function that does not require the user's input. For example, when a battery voltage of the mobile terminal 100 is reduced below a preset level, the controller 180 can determine it as the occurrence of an event. The controller 180 can also display a result of sensing such a state change of the mobile terminal 100 through notification information. Notification information for notifying the state change of the mobile terminal 100 to the user can be associated with a function that does not require the user's input.

Accordingly, as illustrated in the above FIG. 11, when at least some of a plurality of notification information is selected and a character string entered from the user is applied at the same time to the selected notification information, the controller 180 of the mobile terminal 100 according to an embodiment of the present disclosure can display notification information associated with a character string input allowed function and notification information not associated therewith in a distinguished manner.

Next, FIG. 12 illustrates an example in which notification information into which a character string entered from the user can be applied and notification information into which a character string entered from the user cannot be applied are displayed in a distinguished manner according to a function or application associated therewith as described above. A first drawing of FIG. 12 illustrates an example in which a plurality of notification information 300, 302 that belong to different groups are displayed. Furthermore, the controller 180 can select at least one notification information from the user.

For example, the user's selection can be performed with the user's touch input to any one of the plurality of notification information. In this instance, if the user selects a first graphic object 350, then the controller 180 determine that any one notification information corresponding to the first graphic object 350 has been selected by the user. Furthermore, the controller 180 can display an input region and a key region adjacent to the selected notification information.

As illustrated in a second drawing of FIG. 12, when the user selects a second graphic object 360, the controller 180 can determine that the user selects a plurality of notification information at the same time. Accordingly, the controller 180 can display notification information including the currently selected second graphic object 360, namely, the first notification information 300, from the other notification information in a distinguished manner to display that the first notification information 300 is selected as illustrated in FIG. 11.

As illustrated in the second drawing of FIG. 12, when it is determined that the user selects a plurality of notification information, the controller 180 can check a function (or application) associated with currently displayed notification information, respectively, to divide the notification information into notification information associated with a function to which a character string can be entered and a notification information associated with a function to which a character string cannot be entered. For example, in case of notification information associated with a message function, an email function or an SNS function as described above, the controller 180 can classify it as a function to which the character string can be entered. However, notification information such as battery state notification or the communication state notification of the mobile terminal 100 may be classified as notification information associated with a function to which the character string cannot be entered.

Accordingly, the controller 180 can display the plurality of notification information in a distinguished manner according to the classified result. For example, the controller 180 can allow notification information classified to be associated with a function to which the character string cannot be entered to have a different color or to have a different brightness or sharpness in a region displayed with the notification information, thereby displaying that the user cannot enter a character string into the notification information. Accordingly, the user can identify only notification information into which a character string can be entered in advance among a plurality of notification information, and select at least some of notification information into which the character string can be entered.

The foregoing description has described an example in which when specific notification information is selected from the user, an input region and a key region corresponding to the selected notification information are displayed, but an execution screen of a function corresponding to the selected notification information can be displayed on the display unit 151 according to the user's selection. In this instance, the execution screen may be also displayed through the enter screen of the display unit 151.

Figure 13:
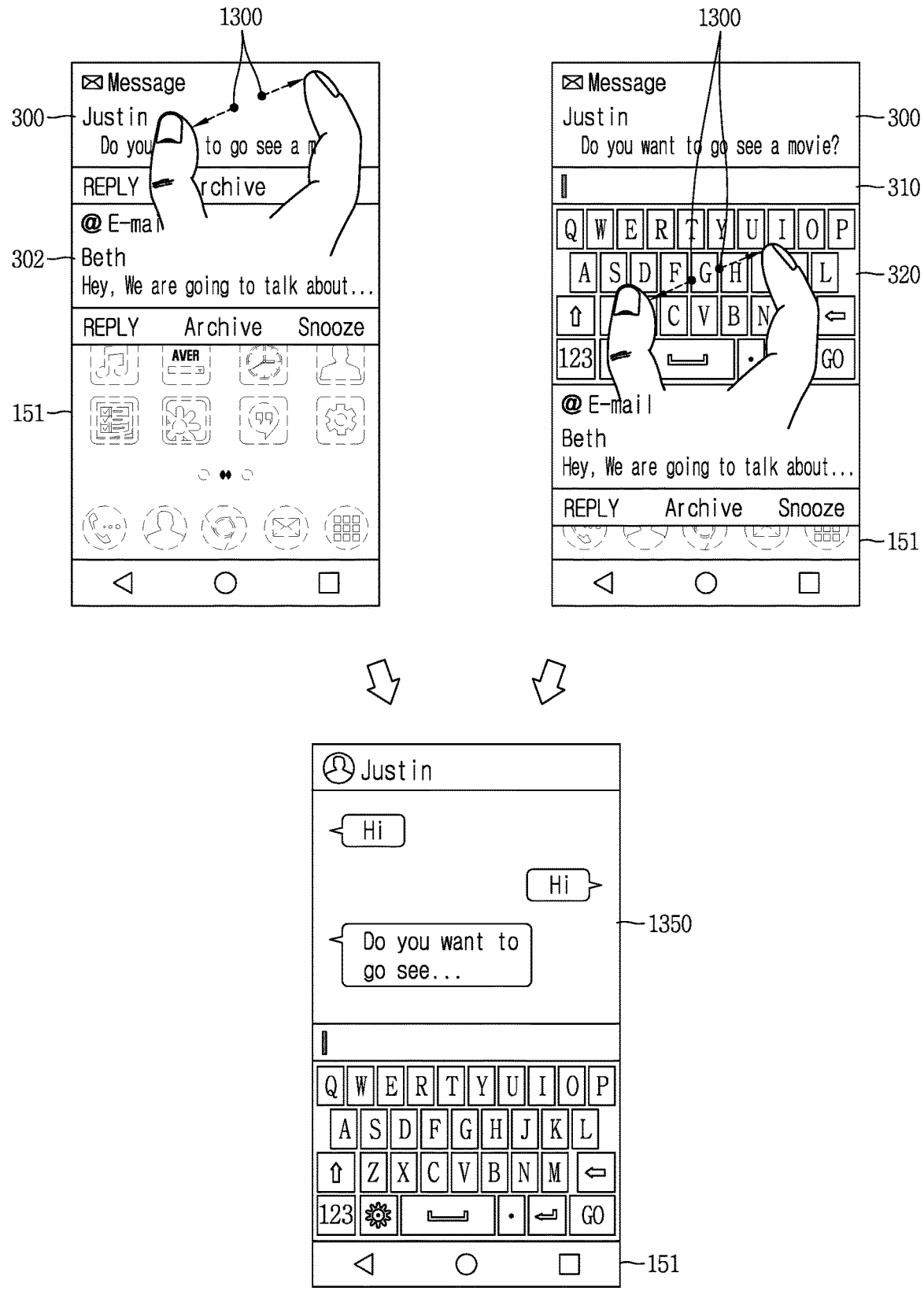
FIG. 13 is a view illustrating an example in which an execution screen of a function corresponding to specific notification information is displayed in a mobile terminal according to an embodiment of the present disclosure.

FIG. 13 is a view illustrating an example in which an execution screen of a function corresponding to specific notification information is displayed in the mobile terminal 100 according to an embodiment of the present disclosure. A first drawing of FIG. 13 illustrates an example in which a plurality of notification information 300, 302 are displayed on the display unit 151. In this state, when the user selects any one notification information (first notification information 300), the controller 180 can display the first input region 310 corresponding to the first notification information 300 adjacent to the first notification information 300 and display the first key region 320 adjacent to the first input region 310 on the display unit 15 as illustrated in a second drawing of FIG. 13.

As illustrated in the first drawing of FIG. 13, the controller 180 can sense a user's preset touch gesture input applied to any one notification information. For example, the touch gesture input may be a pinch-out gesture to which at least one drag input is applied so a separation distance between touch input points increases when the touch inputs are applied at the same time to the plurality of points on the display unit 151. When a pinch-out gesture is sensed as described above, the controller 180 can display an execution screen of a specific function on the display unit 151 based on any one notification information corresponding to the pinch-out gesture.

In other words, as illustrated in the first drawing of FIG. 13, when the pinch-out gesture is applied to a region displayed with the first notification information 300, the controller 180 can display an execution screen of a function corresponding to the first notification information 300 on the display unit 151. Accordingly, when the first notification information 300 is notification information for notifying the reception of a message, the controller 180 can display an execution screen 1350 of a message function on the display unit 151 as illustrated in a third drawing of FIG. 13.

In this instance, the execution screen 1350 of the message function may further include another content associated with the first notification information 300. In other words, as illustrated in the third drawing of FIG. 13, the controller 180 can display a message corresponding to the first notification information 300 and a plurality of different messages associated with the message on the display unit 151.

Further, the pinch-out gesture may be also applied even when specific notification information has been previously selected as illustrated in the second drawing of FIG. 13. In other words, when the pinch-out gesture is applied when the input region 310 and key region 320 corresponding to the first notification information 300 are displayed, the controller 180 can display an execution screen of a function corresponding to notification information to which the pinch-out gesture is applied as illustrated in the third drawing of FIG. 13.

The foregoing description has described an example in which an execution screen of a function corresponding to specific notification information is displayed based on a user's preset touch gesture, but on the contrary, when a preset different touch gesture is applied, it can be switched from a state in which the execution screen of the function is displayed to a state in which a plurality of notification information are displayed or a state in which specific notification information is selected. In other words, in a state illustrated in the third drawing of FIG. 13, when a pinch-in gesture, namely, a gesture in which at least one drag input is applied to decrease a separation distance between the touch input points when touch inputs are applied at the same time to a plurality of points, is sensed, the controller 180 can switch it to a screen displayed with the plurality of notification information (the first drawing of FIG. 13) or a screen selected by specific notification information (the second drawing of FIG. 13) based on the gesture.

Here, a screen switched according to the pinch-in gesture can be determined according to whether the pinch-out gesture is entered when any one of the plurality of notification information is selected or the pinch-out gesture is entered when the any one notification information is not selected. Further, the mobile terminal 100 according to an embodiment of the present disclosure can provide a function capable of providing the user's frequently used word as a recommendation word based on a result of analyzing a character string entered by the user.

Figure 14:
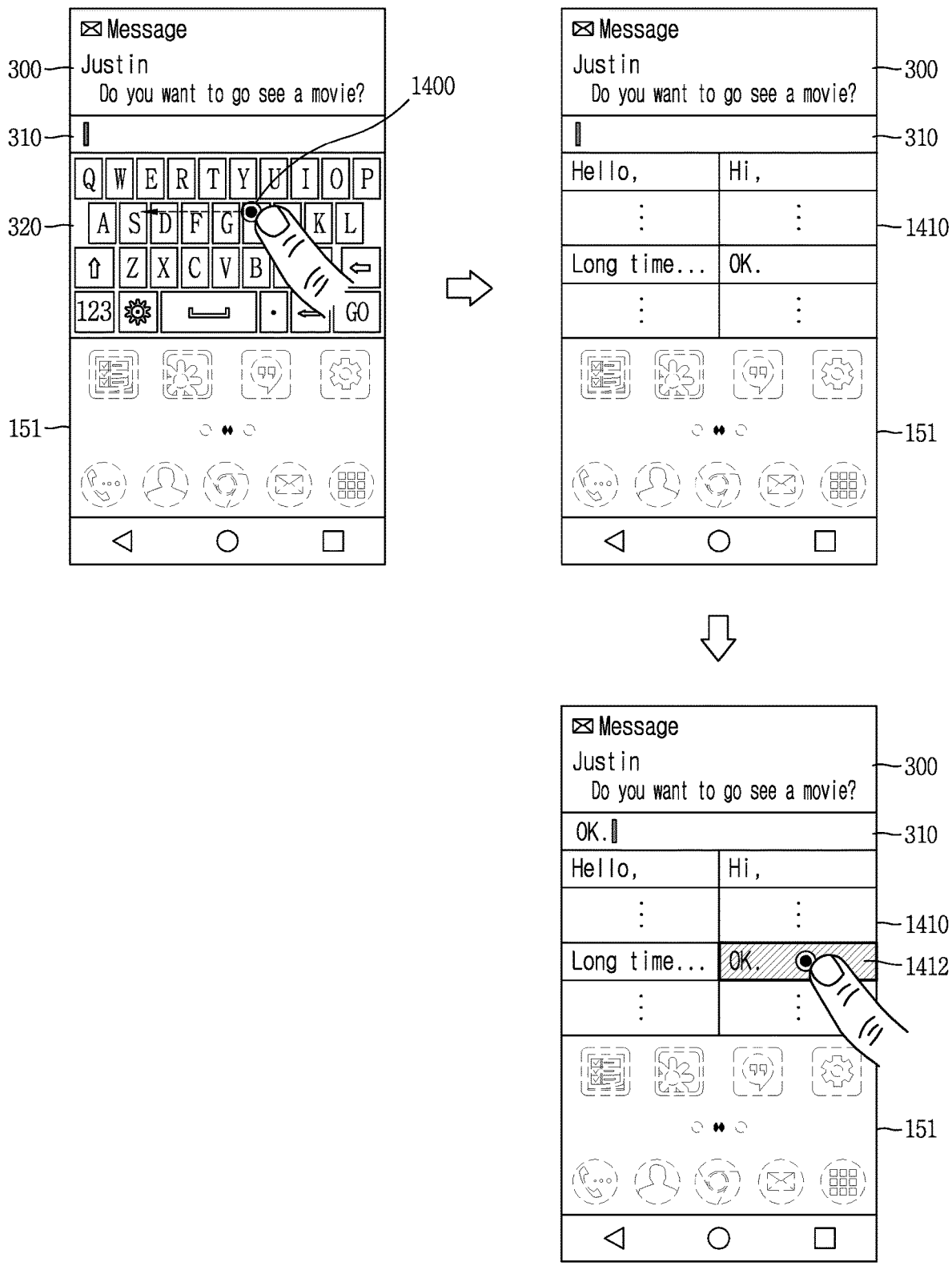
FIG. 14 is a view illustrating an example in which a recommendation word list is displayed according to a user's selection in a mobile terminal according to an embodiment of the present disclosure.

Next, FIG. 14 is a view illustrating an example in which a recommendation word list is displayed according to a user's selection in the mobile terminal 100 according to an embodiment of the present disclosure. A first drawing of FIG. 14 illustrates an example in which any one notification information (first notification information 300) is selected. Furthermore, the controller 180 can display the input region 310 and key region 320 corresponding to the first notification information 300 on the display unit 151.

The controller 180 can sense a user's preset touch gesture for displaying the recommendation word list. In other words, as illustrated in the first drawing of FIG. 14, when a drag input 1400 applied in a specific direction from one point of the key region 320 by more than a preset length is sensed, the controller 180 can sense it as a user's input for displaying the recommendation word list.

Further, the recommendation word list can be generated according to a result of analyzing character strings entered by the user for a more than a preset period of time. In other words, when a character string is entered, the controller 180 can identify each word included in the entered character string, and calculate a number of the identified each words included in the entered character string. In addition, the controller 180 can add the calculated numbers for each word to a use frequency of the corresponding word among use frequencies for each word calculated by the previously entered character strings. Accordingly, the controller 180 can identify a user's frequently used word based on the use frequency, and add it to the recommendation word list in case of a word for which the use frequency is above a predetermined number.

When the drag input 1400 is applied, as illustrated in a second drawing of FIG. 14, the controller 180 can display a recommendation word list 1410 on the display unit 151. For example, the controller 180 can display words included in the recommendation word list to be sorted according to the user's use frequency or display them to be sorted according to an initial character of each recommendation word. When the user selects any one of the recommendation word list 1410, the controller 180 can determine that the selected word is applied to currently selected notification information.

Accordingly, as illustrated in a third drawing of FIG. 14, when the user selects a specific word 1412, the selected word can be entered into an input region corresponding to currently selected notification information, namely the first input region 310. Furthermore, it may be processed as an input of a function corresponding to currently selected notification information, namely, first notification information 300, according to the user's selection.

The foregoing description has described an example in which only a character string consisting of characters or symbols is entered, but various multimedia content as well as the character string can also be entered according to the user's selection.

In the following description, an example of entering a multimedia content as described above will be described using a plurality of exemplary views. In particular, FIGS. 15 and 16 are views illustrating an example in which a multimedia content is entered as a user input to notification information using another notification information associated with the multimedia content in the mobile terminal 100 according to an embodiment of the present disclosure.

Figure 15:
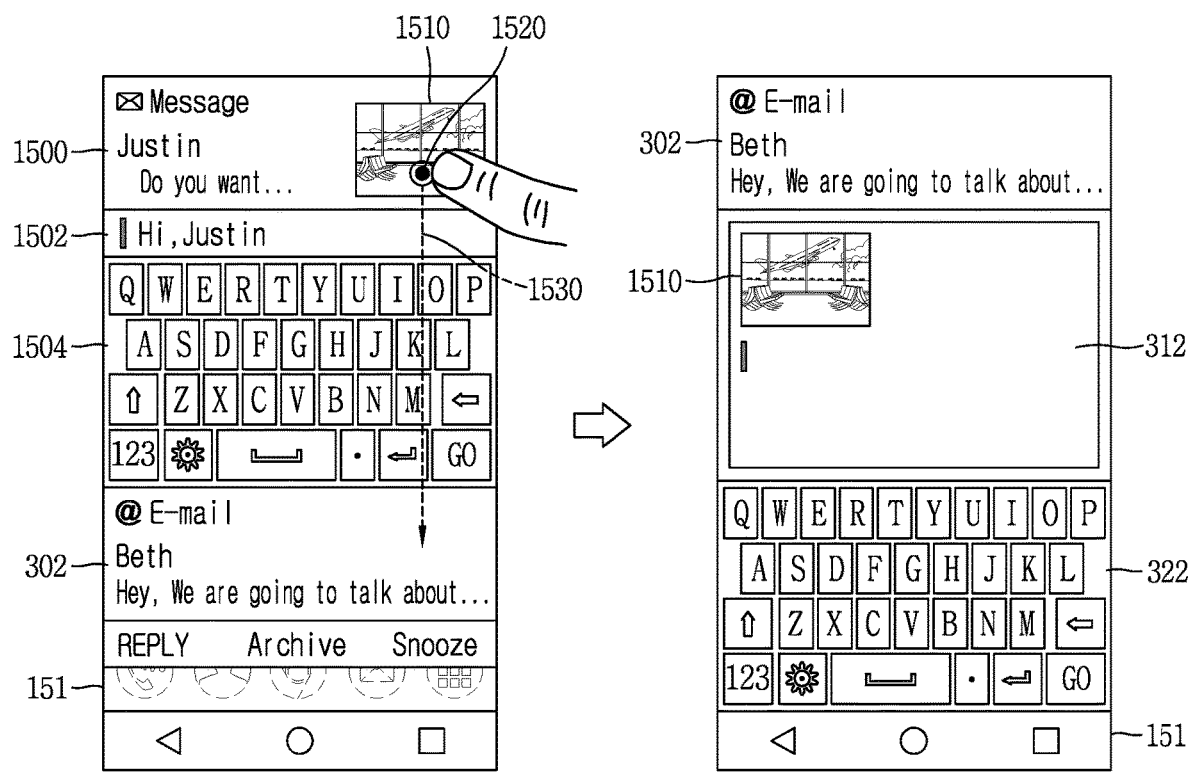
FIGS. 15 and 16 are views illustrating an example in which a multimedia content is entered as a user input to notification information using another notification information associated with the multimedia content in a mobile terminal according to an embodiment of the present disclosure.
Figure 16:
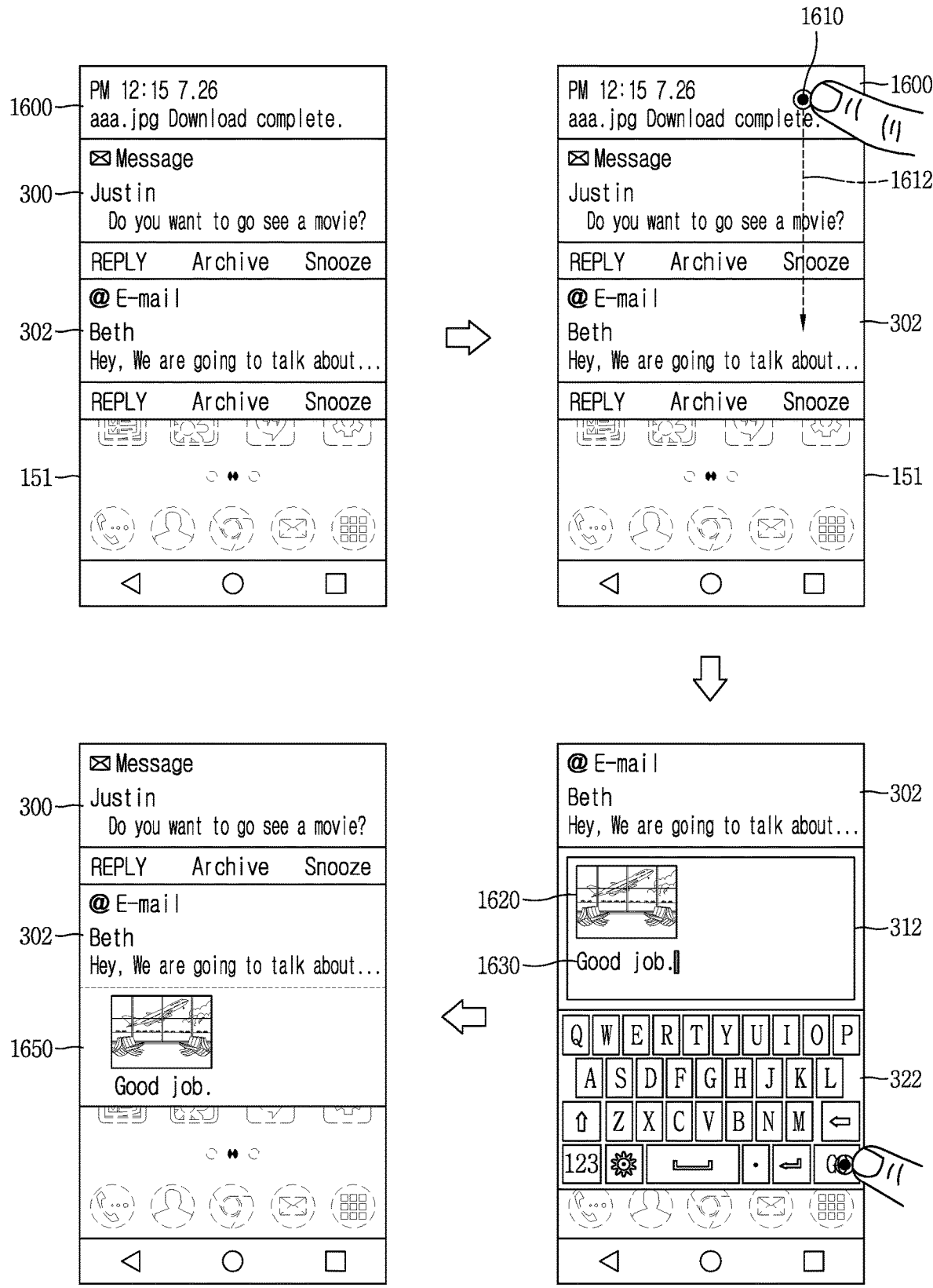

A first drawing of FIG. 15 illustrates an example in which any one of a plurality of notification information includes a multimedia content, and notification information including the multimedia content is selected by a user. For example, when a multimedia message including an image is received, the mobile terminal 100 according to an embodiment of the present disclosure can display notification information for notifying the reception of the multimedia message. The notification information can display information on a multimedia content included in the received message. For example, when the multimedia content is an image, the information on the multimedia content may be a thumbnail image generated from the image, and when the multimedia content is a video, the information on the multimedia content may be a thumbnail image generated from a still cut image extracted from the video. Alternatively, when the multimedia content is sound source data, the information on the multimedia content may be a graphic object for displaying the sound source data.

When the user selects first notification information 1500 including the multimedia content in a state that the notification information is displayed, the controller 180 can display the first notification information 1500 including the multimedia content information 1510, and an input region 1502 and a key region 1504 corresponding to the first notification information 1500 on the display unit 151 as illustrated in the first drawing of FIG. 15. Furthermore, the controller 180 can display a user's input applied through the key region 1504 in the input region 1502.

The controller 180 can sense a user's first input 1520 for selecting the multimedia content information 1510 included in the first notification information 1500. For example, the first input 1520 may be a touch input applied to one point in a region displayed with the multimedia content information 1510 for more than a preset period of time or a touch input applied at a pressure above a preset level. When the first input 1520 is applied, the controller 180 can determine that a multimedia content corresponding to the multimedia content information 1510 has been selected by the user.

The controller 180 can sense a user's second input 1530 applied subsequent to the first input 1520. For example, the second input 1530 may be a drag input applied from one point on the display unit 151 to which the first input 1520 is applied to another point. When the second input 1530 is sensed, the controller 180 can determine that notification information corresponding to the another point on the display unit 151 according to the second input 1530 is selected by the user.

For example, as illustrated in the first drawing of FIG. 15, when the second input 1530 is applied to one region on the display unit 151 displayed with the second notification information 302, the controller 180 can determine that the second notification information 302 is selected according to the second input 1530. Then, the controller 180 can enter a multimedia content corresponding to the multimedia content information 1510 as an input to the second notification information 302 according to the second input 1530. A second drawing of FIG. 15 illustrates such an example.

The second drawing of FIG. 15 illustrates an example of a multimedia content being entered into the second notification information 302 according to the second input. In this instance, the controller 180 can display the multimedia content information 1510 corresponding to the entered multimedia content in the second input region 312 corresponding to the currently selected second notification information 302. Furthermore, the controller 180 can receive the user's input through the second key region 322 displayed adjacent to the second input region 312.

When the user selects input completion through the second key region 322, the controller 180 can transmit a multimedia content extracted from the first notification information 1500 and a reply email including a character string entered from the user to the sender of an email corresponding to the second notification information through a function corresponding to the second notification information 302, namely, an email function. Accordingly, the present disclosure can immediately enter and process a multimedia content included in specific notification information as an input of a function corresponding to another notification information as illustrated in the second the drawing of FIG. 15.

FIG. 15 has described an example in which a multimedia content extracted from the received multimedia message is processed as an input of a function corresponding to another notification information, but the multimedia content can be entered as an input of a function corresponding to notification information using another notification information for notifying the operation state of a function associated with the multimedia content.

FIG. 16 illustrates an example of such a case. A first drawing of FIG. 16 illustrates an example in which notification information 1600 for notifying the operation state of a function associated with a multimedia content. Here, a function associated with the multimedia content may include downloading a multimedia content, and notification information associated with the multimedia content may be notification information associated with a download state of the multimedia content.

Accordingly, when a multimedia content selected from the user is downloaded, the controller 180 can display a download state of the multimedia content through notification information. Furthermore, as illustrated in the first drawing of FIG. 16, when the download of the multimedia content is completed, the completed state can be displayed through notification information.

The controller 180 can sense a user's first input 1610 applied to the multimedia content related notification information 1600 as illustrated in a second drawing of FIG. 16. Here, the first input 1610 may be an input for selecting the multimedia content related notification information 1600. When the multimedia content related notification information 1600 is selected according to the first input 1610, the controller 180 can determine that the user has selected a multimedia content corresponding to the multimedia content related notification information 1600.

The controller 180 can sense a user's second input 1612 applied subsequent to the first input 1610. Furthermore, the second input 1612 may be a drag input applied to a region displayed with another notification information, namely, the second notification information 302 from one point on the display unit 151 to which the first input 1610 is applied. Accordingly, the controller 180 can determine that the second notification information 302 is selected according to the second input 1612. Furthermore, the second input region 312 and second key region 322 corresponding to the currently selected second notification information 302 can be displayed on the display unit 151.

The controller 180 can enter a multimedia content selected by the first input 1610 as an input to currently selected notification information according to the second input 1612, namely, the second notification information 302. Accordingly, as illustrated in a third drawing of FIG. 16, multimedia content information 1620 generated from currently selected multimedia content can be displayed in the second input region 312. Furthermore, the controller 180 can display a character string according to a user's input applied from the second key region 322 to the second input region 312.

The controller 180 can select input completion through the second key region 322. Then, the controller 180 can process a multimedia content and a character string entered into the second input region 312 as an input of a function corresponding to the second notification information 302. Accordingly, as illustrated in a fourth drawing of FIG. 16, a result of transmitting a reply mail including the multimedia content and character string to the sender of a mail corresponding to the second notification information 302 can be displayed.

As illustrated in FIG. 16, notification information associated with the multimedia content may be notification information associated with a download state of the multimedia content. Accordingly, the notification information may display a state in which a multimedia content is being downloaded.

Figure 17:
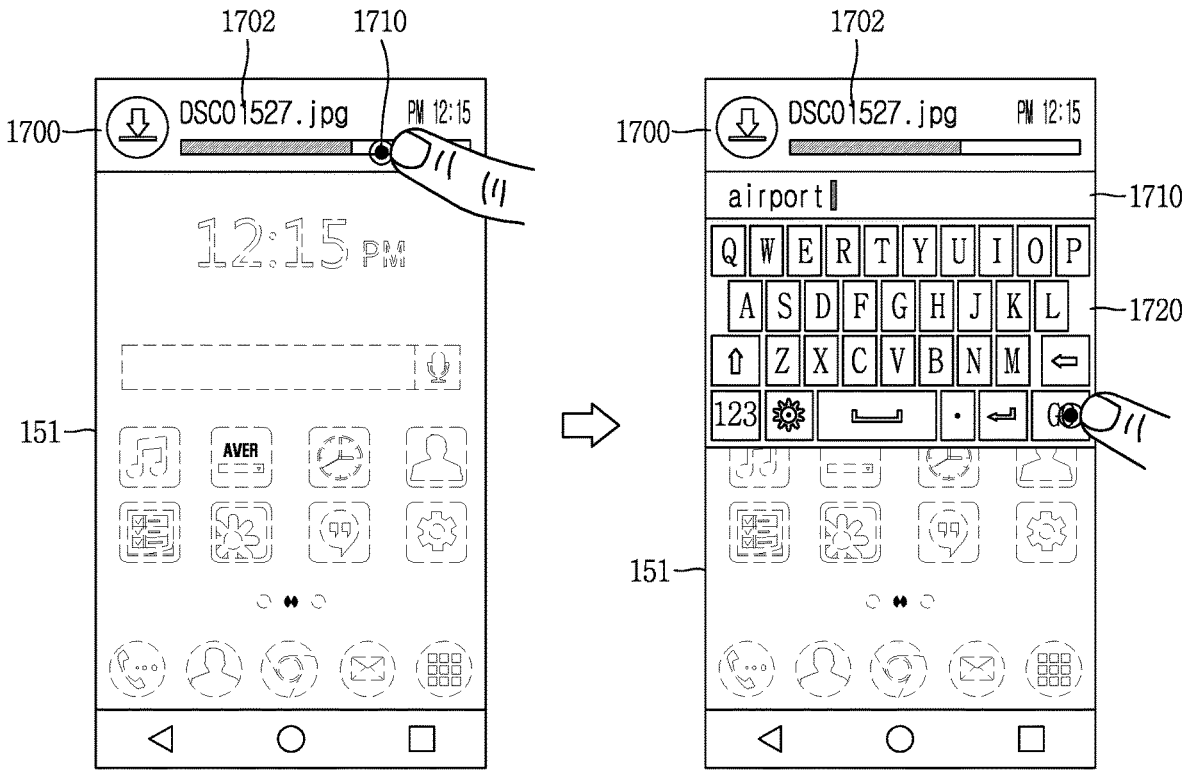
FIG. 17 is a view illustrating an example in which a multimedia content corresponding to notification information is processed according to a user input when the notification information associated with the multimedia content is selected in the mobile terminal 100 according to an embodiment of the present disclosure.
Figure 17:
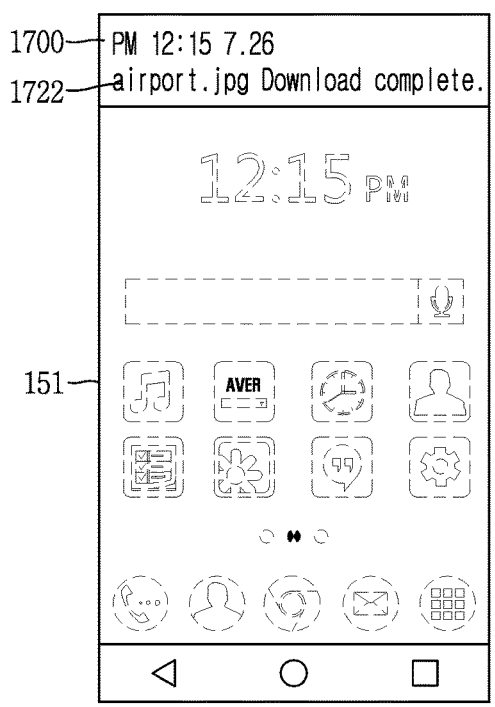

FIG. 17 is a view illustrating an example in which a multimedia content corresponding to notification information is processed according to a user input when the notification information associated with the multimedia content is selected in the mobile terminal 100 according to an embodiment of the present disclosure in such a case.

A first drawing of FIG. 17 illustrates an example in which notification information 1700 indicating the state of a multimedia content being downloaded is displayed. In this instance, the notification information 1700 may include a name 1702 of a multimedia content currently being downloaded.

The controller 180 can sense a user's input 1710 applied to the notification information 1700. When the user input 1710 is applied to the notification information 1700 as illustrated in the first drawing of FIG. 17, the controller 180 can display an input region 1710 and a key region 1720 corresponding to the notification information 1700 on the display unit 151 as illustrated in the second drawing of FIG. 17.

Then, the controller 180 can display a character string formed according to a user's input applied through the key region 1720 in the input region 1710. When the user selects input completion, the character string may be entered as an input to the notification information 1700. Furthermore, the controller 180 can process the entered character string in connection with the currently downloaded multimedia content.

For example, the controller 180 can set the entered character string to the name of a multimedia content corresponding to the notification information. In this instance, the controller 180 can change the name of the downloaded multimedia content to a character string entered through the input region 1710 immediately when the download of a multimedia content corresponding to the notification information 1700 is completed. Accordingly, when the download is completed, the controller 180 can display that the download of the multimedia content has been completed through the notification information 1700, and display the name of the downloaded content as a name 1722 according to the entered character string as illustrated in the third drawing of FIG. 17.

Further, the foregoing description has described only an example of a case where notification information on a previously occurred event is displayed such as a previously received message, email or the like, but information associated with a function currently being performed on the mobile terminal 100 can be displayed in the form of the notification information as well.

Figure 18:
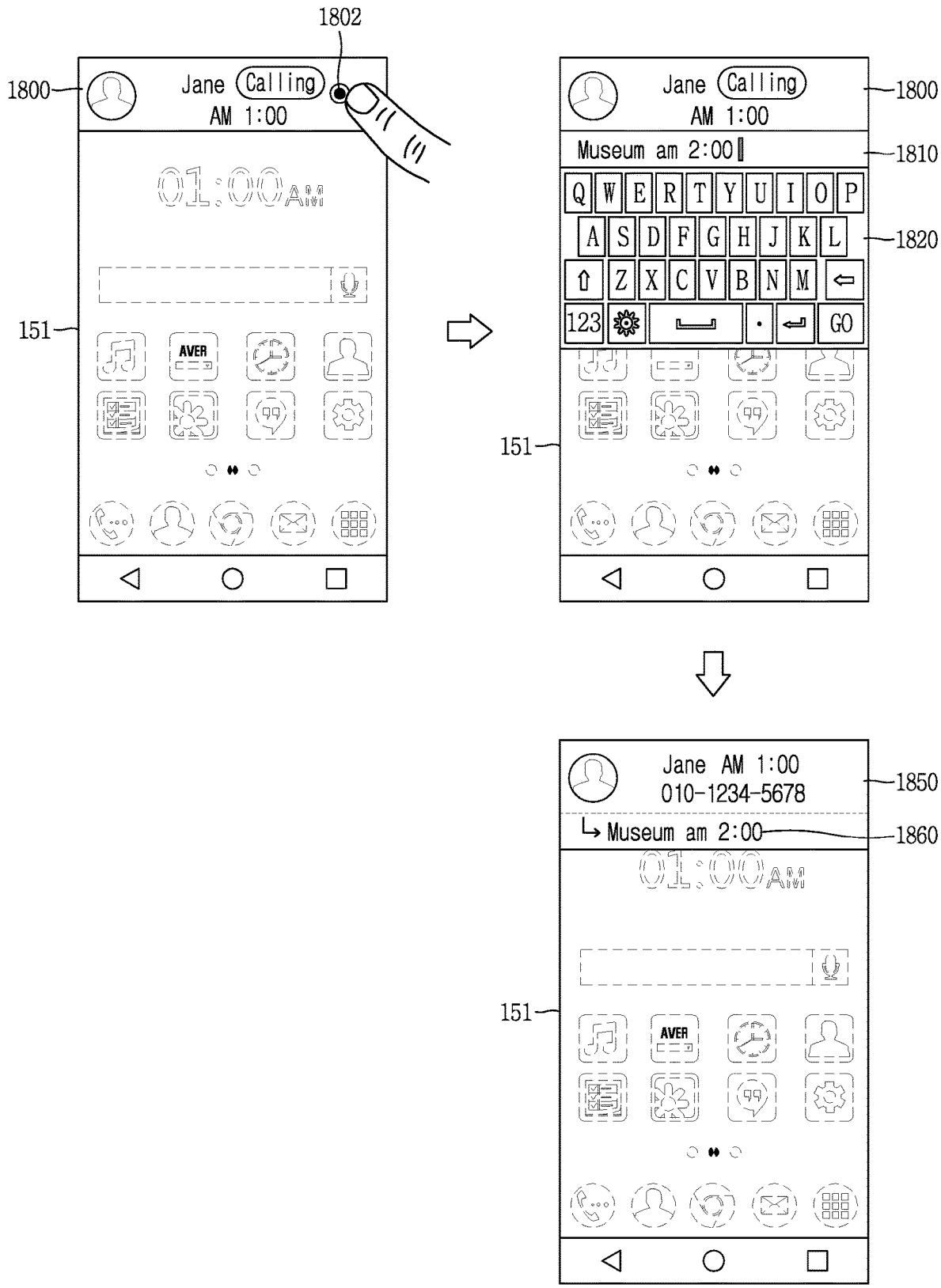
FIG. 18 is a view in which a user input applied during the execution of a call function is stored in a mobile terminal according to an embodiment of the present disclosure.
Figure 19:
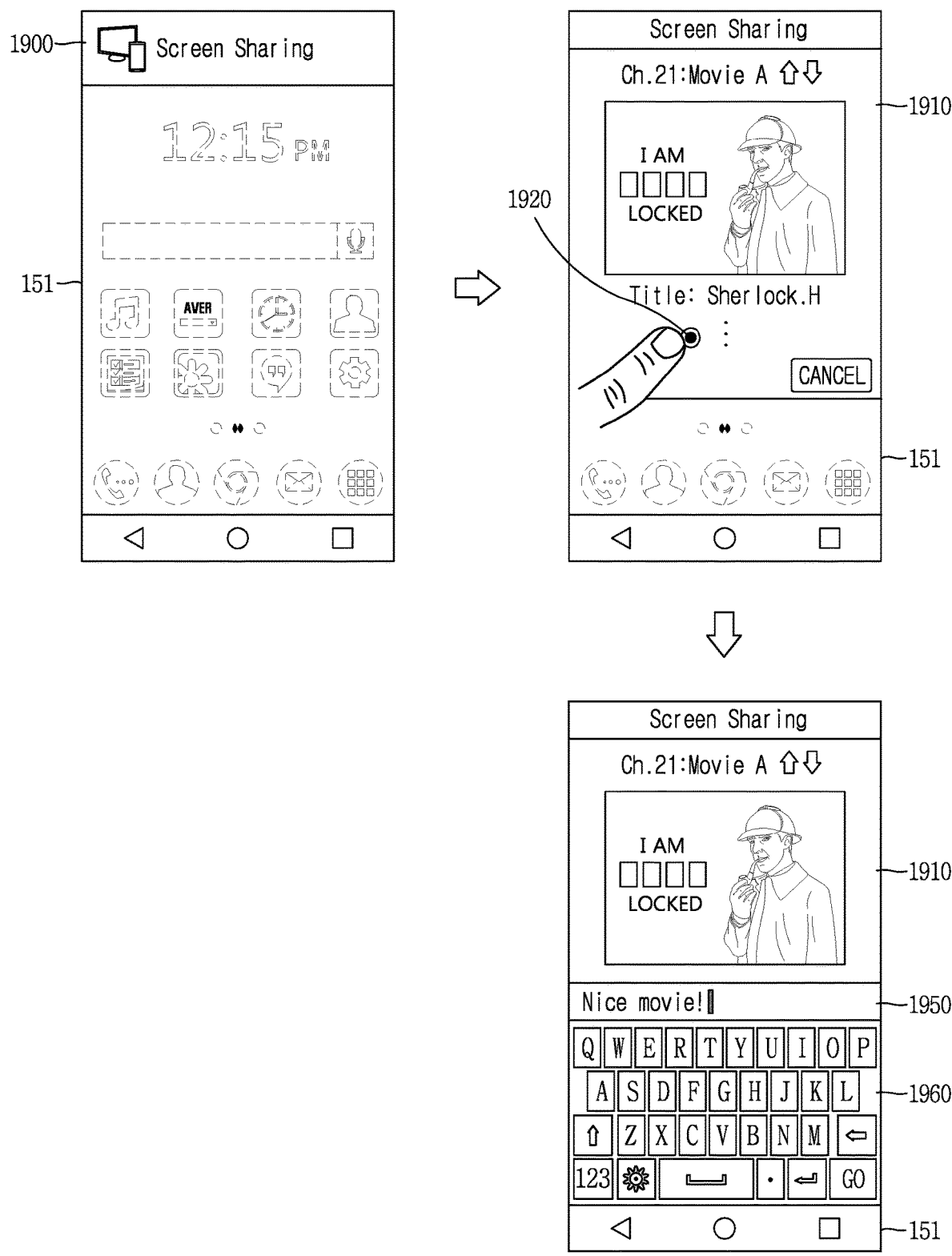
FIG. 19 is a view in which a user's input to a peripheral device connected to a mobile terminal is stored in the mobile terminal according to an embodiment of the present disclosure.

FIGS. 18 and 19 illustrate examples of such a case. First, FIG. 18 is a view illustrating an example in which when the mobile terminal 100 according to an embodiment of the present disclosure performs a call function according to call incoming or call receiving, the operation state of the mobile terminal 100 performing the call function is displayed as notification information.

A first drawing of FIG. 18 illustrates an example in which notification information 1800 for indicating that a call function is currently being performed on the mobile terminal 100 is displayed. Furthermore, the controller 180 can sense a user's input 1802 applied to the notification information 1800.

When the user input 1802 is applied to the notification information 1800, the controller 180 can display an input region 1810 and a key region 1820 on the display unit 151 as illustrated in a second drawing of FIG. 18. In this instance, the input region 1810 can be displayed adjacent to the notification information 1800 to indicate that the input region 1810 corresponds to the notification information 1800, and the key region 1820 can be displayed adjacent to the input region 1810.

When the input region 1810 and key region 1820 corresponding to the notification information 1800 for notifying that a call function is being performed is displayed on the mobile terminal 100, the controller 180 can receive a user's input through the key region 1820. Accordingly, as illustrated in the second drawing of FIG. 18, a character string according to the user's input can be entered into the input region 1810.

The controller 180 can sense whether or not the input has been completed. For example, when a specific key among keys on the key region 1820 is selected, the controller 180 can determine it as input completion. Alternatively, when the execution of a function corresponding to the currently selected notification information 1800 is ended, the controller 180 can determine that the input has been completed. Then, the controller 180 can receive a character string that has been entered until the input completion is sensed as an input to the currently selected notification information 1800.

As illustrated in FIG. 18, when notification information selected from the user is notification information associated with a specific function performed on the mobile terminal 100, the controller 180 can store the user's input applied to the notification information as an input associated with the specific function.

For example, as illustrated in the above FIG. 18, when the currently selected notification information 1800 is associated with a specific call performed on the mobile terminal 100, the controller 180 can store a character string entered from the user as information associated with a call corresponding to the relevant notification information 1800. In this instance, the stored information may be stored as an additional memo or additional text file.

Further, the controller 180 can store the stored information as information associated with the call history of a call corresponding to the notification information 1800. In other words, when a call corresponding to the notification information 1800 is ended, the controller 180 can display call history information on the call on the display unit 151 according to the user's selection.

Then, as illustrated in a third drawing of FIG. 18, the controller 180 can display the information stored in connection therewith, namely, a character string 1860 entered to notification information selected during the call, along with the call history information 1850 of the call. Accordingly, the present disclosure may allow the user to immediately make a memo for key content during a call while performing the call through the mobile terminal 100, and check the information of the memo through the call history information of the relevant call.

Further, FIG. 19 is an example of when a peripheral device is connected to the mobile terminal 100 to perform a function according to the connected peripheral device in the mobile terminal 100 according to an embodiment of the present disclosure. A first drawing of FIG. 19 illustrates an example in which the mobile terminal 100 is connected to an image display device such as a TV among peripheral devices around the mobile terminal 100, and the resultant function (for example, screen sharing function) is performed. In this instance, the controller 180 can display notification information 1900 indicating that the screen sharing function is currently being performed on the display unit 151. Furthermore, the controller 180 can display a screen according to a function currently being performed, namely, a screen sharing function, on the display unit 151 according to the user's selection.

When the mobile terminal 100 is connected to a preset TV to perform a screen sharing function, the controller 180 can display an image 1910 of a broadcast content provided from the connected TV and various information associated with the broadcast content on the display unit 151 as illustrated in a second drawing of FIG. 19.

The controller 180 can sense a user's input 1920 applied to the display unit 151. When the user's input 1920 is sensed, the controller 180 can display an input region 1950 and a key region 1960 corresponding to a function currently being performed, namely, a screen sharing function on the display unit 151, as illustrated in a third drawing of FIG. 19. Furthermore, the controller 180 can display the user's input applied through the key region 1960 in the input region 1950.

The controller 180 can store such a user's input as one associated with a function of the mobile terminal 100 currently being performed. More preferably, the controller 180 can store the user's input as one for a broadcast content currently displayed on the display unit 151. Then, the controller 180 can store a character string entered from the user along with information associated with the broadcast content, namely, a name, channel information, a broadcast time of the broadcast content, and the like. The stored information may be stored in the form of an additional memo or additional text file.

In addition, the controller 180 can upload the user's input as a post for a broadcast content currently displayed on the display unit 151 to a preset server. In other words, when a broadcast content of a specific channel is displayed as illustrated in FIG. 19, the controller 180 can upload a character string entered from the user to a broadcast server corresponding to the relevant channel or a preset server associated with the broadcast content. In this instance, the character string uploaded by the user can be shared with viewers who view the channel or broadcast content at the same time.

The foregoing description describes an example in which when specific notification information is selected by a user, an input region for displaying a user's input corresponding to the selected notification information and a key region for receiving an input entered into the input region are displayed, but the input region or the key region can be displayed with a different input region and key region according to the type of the selected notification information.

For example, when the selected notification information is information on an image, the controller 180 can display a region capable of modifying an image included in the notification information instead of the key region. Then, the controller 180 can display a region for the image modification in response to the selection of the notification information.

When there is a preset user to display a key region including specific keys, the controller 180 can display the resultant key region. In other words, when the selected notification information is notification information on a message or email received from a user set to the key region in advance, a preset key region can be displayed to correspond to the user. Accordingly, in case of a message or mail received from a foreigner, a key region configured with a language corresponding to the sender of the received message or mail can be displayed, and thus the user cannot be required to change a layout every time according to the language.

The foregoing present invention may be implemented as codes readable by a computer on a medium written by the program. The computer-readable media may include all kinds of recording devices in which data readable by a computer system is stored. Examples of the computer-readable media may include hard disk drive (HDD), solid state disk (SSD), ROM, RAM, CD-ROM, magnetic tape, floppy disk, and optical data storage device, and the like, and also include a device implemented in the form of a carrier wave (for example, transmission via the Internet). In addition, the computer may include the controller 180 of the terminal. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

As the present invention may be embodied in several foal's without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal, comprising:
    a wireless communication interface configured to transmit or receive wireless signals;
    a display configured to display at least a first notification information at a first position on the display indicating a first event occurred on the mobile terminal, and display a second notification information at a second position on the display indicating a second event occurred on the mobile terminal; and
    a controller configured to:
    in response to a selection of the first notification information, display a first input region and a first key region for inputting a character string into the first input region on the display adjacent to the first notification information,
    in response to a selection of the second notification information, display a second input region and a second key region for inputting the character string into the second input region on the display adjacent to the second notification information, and
    process the character string input into the first input region or the second input region as an input of a function for responding to the first notification information or the second notification information, respectively, according to a selection of a user,
    wherein the controller is further configured to control the display to display all of the first key region, the first input region, the second key region and the second input region by further displaying the second key region and the second input region, when the second notification information is selected in a state in which the first key region and the first input region are displayed as the first notification information is selected,
    wherein the first key region and the first input region, and the second key region and the second input region are separate from each other, and
    wherein the controller is further configured to:
    check whether or not there is a second character string previously entered into the second input region, when a user input from the first input region to the second input region is sensed,
    if the second character string already exists in the second input region, divide the second input region into a plurality of regions,
    display a first character string inputted in the first input region and the second character string inputted in the second input region in different divided regions, and
    process any one of the strings inputted to the plurality of regions according to the user's selection as an input to the second input region.

2. The mobile terminal of claim 1, wherein the first input region and the first key region are displayed between the first notification information and the second notification information, and
    wherein the first input region is displayed subsequent to the first notification information, and the first key region is displayed subsequent to the first input region.

3. The mobile terminal of claim 2, wherein the controller is further configured to:
    display third notification information at a third position on the display indicating a third event occurred on the mobile terminal, and
    in response to a touch and drag from the first input region to the third notification information, copy the character string input into the first input region and display a third input region adjacent to the third notification information with the copied character string.

4. The mobile terminal of claim 3, wherein the first notification information comprises a graphic object corresponding to a multimedia content associated with the first event, and
    wherein the controller is further configured to:
    in response to a touch and drag from the multimedia content to the third notification information, copy the multimedia content and display the third input region adjacent to the third notification information with the copied multimedia content.

5. The mobile terminal of claim 1, wherein the controller is further configured to:
    in response to the selection of the first notification information, display the first notification information, the first input region and the first key region in a first preset region of the display and display the second notification information in a second preset region of the display.

6. The mobile terminal of claim 5, wherein the controller is further configured to:
    scroll the second notification information to display third notification information in the second region in response to a drag input applied to the second preset region.

7. The mobile terminal of claim 1, wherein the controller is further configured to:
    in response to the second notification information being selected in a state that the first notification information is selected and the character string is input into the first input region, copy the character string input into the first region into the second input region corresponding to the second notification information.

8. The mobile terminal of claim 1, wherein the controller is further configured to:
    divide the first notification information and any additional notification information having a same first preset criteria as the first notification information into a first group and divide the second notification information and any additional notification information having a same second preset criteria as the second notification information into a second group,
    display a first group name for the first group and a second group name for the second group, and
    in response to a selection of the first input region and any one of the second notification information and additional notification information, selectively copy the character string input into the first input region to the selected any one of the second notification information and additional notification information.

9. The mobile terminal of claim 1, wherein the controller is further configured to:
    in response to the first notification information or the second notification information being selected, display the selected one of the first and second notification information and an other of the first and second notification information in a distinguishing manner.

10. The mobile terminal of claim 1, wherein the controller is further configured to:
    sense the first notification information and the second notification information are selected by a user according to whether or not a graphic object included in the first notification information and the second notification information is selected.

11. The mobile terminal of claim 1, wherein the character string input into the first input region includes a preset symbol, and wherein the controller is further configured to:
in response to a touch and drag from the first input region to the second notification information, copy the text into the second notification information while replacing the preset symbol with specific information corresponding to the second notification information.

12. The mobile terminal of claim 11, wherein the specific information replacing the preset symbol is information associated with a location or state of the mobile terminal collected when the second event occurs.

13. The mobile terminal of claim 1, wherein the controller is further configured to:
display a list of words that have been used by a user above a preset number of times according to a result of analyzing character strings input from the user for a preset period of time when a preset user's input is sensed through the first key region, and
input a selected word into the first input region when any one in the list of words is selected.

14. The mobile terminal of claim 1, wherein when there is a preset user's input in a region displayed with the first notification information or in a region where the first input region and the first key region are displayed, the controller is further configured to display an execution screen of a function corresponding to the first notification information on the display, and
wherein the execution screen of the function corresponding to the first notification information is a screen on which at least one different information associated with the first notification information is further displayed.

15. The mobile terminal of claim 1, wherein the first notification information and the second notification information comprise notification information indicating a function performed on the mobile terminal, and
wherein the controller is further configured to:
store the character string input into the first input region as information associated with a specific function of the mobile terminal corresponding to the first notification information when the selected first notification information is notification information indicating the function being performed on the mobile terminal.

16. The mobile terminal of claim 15, wherein the controller is further configured to:
display notification information for indicating that a call function is being performed,
store the character string input into the first input region as information associated with a call connected through the call function when the selected first notification information is notification information indicating that the call function is being performed, and
display the stored information along with the call history information of the call corresponding to the notification information when the call history information for the call is displayed after the ending of the call corresponding to the notification information.

17. A method of controlling a mobile terminal, the method comprising:
displaying, via a display of the mobile terminal, at least a first notification information at a first position on the display indicating a first event occurred on the mobile terminal, and display a second notification information at a second position on the display indicating a second event occurred on the mobile terminal;
in response to a selection of the first notification information, displaying a first input region and a first key region for inputting a character string into the first input region on the display adjacent to the first notification information;
in response to a selection of the second notification information, displaying a second input region and a second key region for inputting the character string into the second input region on the display adjacent to the second notification information; and
processing, via a controller of the mobile terminal, the character string input into the first input region or the second input region as an input of a function for responding to the first notification information or the second notification information, respectively, according to a selection of a user,
wherein the displaying the second input region and the second key region includes displaying all of the first key region, the first input region, the second key region and the second input region by further displaying the second key region and the second input region, when the second notification information is selected in a state in which the first key region and the first input region are displayed as the first notification information is selected,
wherein the first key region and the first input region, and the second key region and the second input region are separate from each other, and
wherein the processing the character string input into the first input region or the second input region as the input of the function further comprises:
checking whether or not there is a second character string previously entered into the second input region, when a user input from the first input region to the second input region is sensed;
if the second character string already exists in the second input region, dividing the second input region into a plurality of regions;
displaying a first character string inputted in the first input region and the second character string inputted in the second input region in different divided regions; and
processing any one of the strings inputted to the plurality of regions according to the user's selection as an input to the second input region.

18. The method of claim 17, wherein the first input region and the first key region are displayed between the first notification information and the second notification information, and
wherein the first input region is displayed subsequent to the first notification information, and the first key region is displayed subsequent to the first input region.

19. The method of claim 18, further comprising:
displaying third notification information at a third position on the display indicating a third event occurred on the mobile terminal; and
in response to a touch and drag from the first input region to the third notification information, copying the character string input into the first input region and display a third input region adjacent to the third notification information with the copied character string.

* * * * *